(12) United States Patent
Tsao

(10) Patent No.: US 7,933,056 B2
(45) Date of Patent: Apr. 26, 2011

(54) METHODS AND SYSTEMS OF RAPID FOCUSING AND ZOOMING FOR VOLUMETRIC 3D DISPLAYS AND CAMERAS

(76) Inventor: Che-Chih Tsao, Arlington, MA (US)

( * ) Notice: Subject to any disclaimer, the term of this patent is extended or adjusted under 35 U.S.C. 154(b) by 206 days.

(21) Appl. No.: 12/237,380

(22) Filed: Sep. 24, 2008

(65) Prior Publication Data

US 2009/0080048 A1 Mar. 26, 2009

Related U.S. Application Data

(60) Provisional application No. 60/995,295, filed on Sep. 26, 2007.

(51) Int. Cl.
*G02B 26/08* (2006.01)

(52) U.S. Cl. ............ 359/211.3; 359/209.1; 359/211.1; 359/211.2; 359/900

(58) Field of Classification Search ............ 359/209.1, 359/210.1, 211.1, 211.2, 211.3, 900, 793, 359/691, 694, 696–698; 353/100, 101; 348/49, 348/E13.074
See application file for complete search history.

(56) References Cited

U.S. PATENT DOCUMENTS

| | | | |
|---|---|---|---|
| 4,670,744 A | 6/1987 | Buzak | |
| 5,954,414 A | 9/1999 | Tsao | 353/7 |
| 6,066,857 A | 5/2000 | Fantone et al. | 250/566 |
| 6,100,862 A | 8/2000 | Sullivan | 345/6 |
| 6,302,542 B1 | 10/2001 | Tsao | 353/7 |
| 6,483,950 B1 | 11/2002 | Wallack | 382/285 |
| 6,765,566 B1 | 7/2004 | Tsao | 345/419 |
| 7,336,407 B1 * | 2/2008 | Adams et al. | 359/211.1 |
| 2003/0067421 A1 | 4/2003 | Sullivan | |

OTHER PUBLICATIONS

Nayar and Nakagawa, "Shape from Focus", IEEE Transaction on Pattern Analysis and Machine Intelligence, vol. 16, No. 8, Aug. 1994, pp. 824.
Noguchi and Nayar, "Microscopic shape from focusing using active illumination", Proc. IEEE Conference on Computer Vision and Image Processing 1994, pp. 147-152.
Yun and Choi, "Fast Shape from Focus using Dynamic Programming", in *Three-Dimensional Image Capture and Applications III*, Ed. by B.D. Corner and J.H. Nurre, Proceedings of SPIE vol. 3958 (2000) pp. 71.
Watanabe et al., "Real-time computation of depth from defocus", Proc. of SPIE v 2599, 1996, pp. 14-25.

* cited by examiner

Primary Examiner — Jack Dinh

(57) ABSTRACT

This invention relates in general to methods and systems of rapid focusing and zooming for the applications in the projection of volumetric 3D images and in the imaging of 3D objects. Rapid variable focusing or zooming is achieved by rapid and repeated change of the object distance or the spacing between lens groups of the projection lens or a combination of both. One preferred approach inserts thin wedge prisms into the optical path and changes their positions relative to the optical path. This changes the thickness traveled through by the optical path and results in effective optical path length change. Another approach folds an optical path by mirrors and moves the mirrors to change the optical path length. For focusing purpose, small and precise displacement is achieved by moving a wedge-shaped optical device obliquely with respect to the optical path. The wedge-shaped optical device can be a thin wedge prism or a mirror on a wedge-shaped base. Optical layout analysis shows that the changes of the object distance, of the spacing between two lens groups and of the image distance are almost in proportion and can be correlated by linear relations. Therefore, the same type of motion function can be used to change these three optical path lengths to achieve focusing and constant magnification.

20 Claims, 11 Drawing Sheets

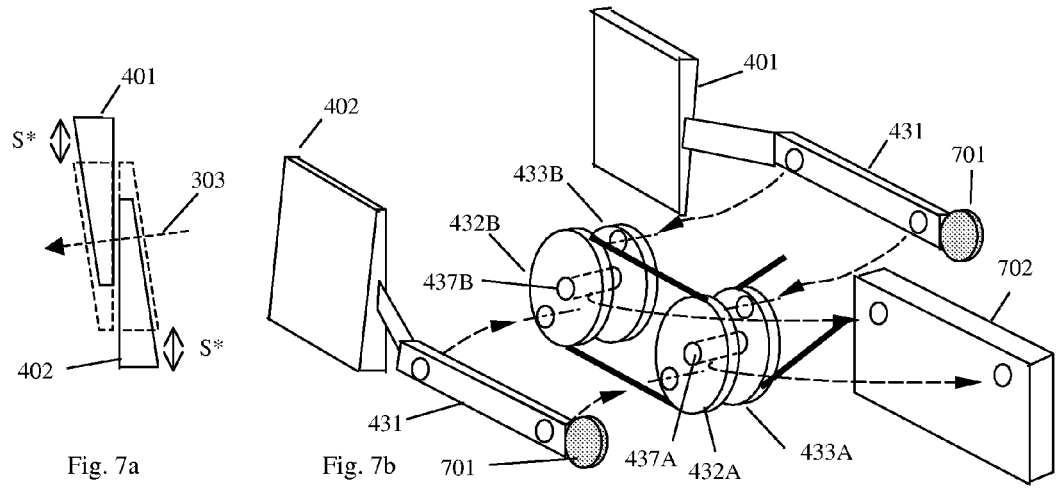
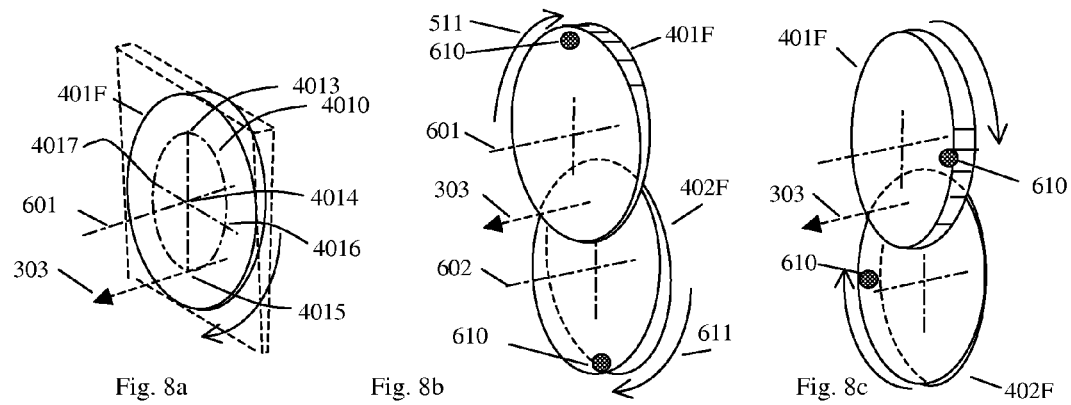
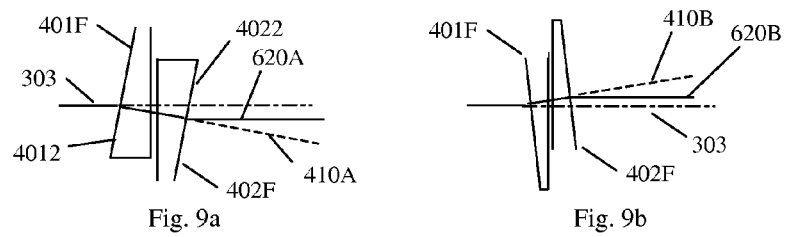
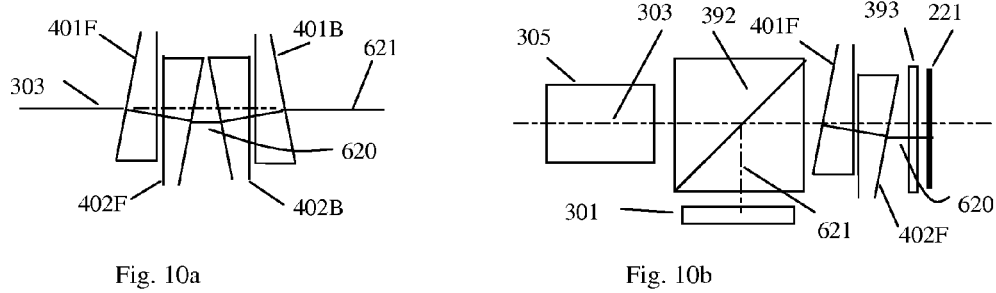

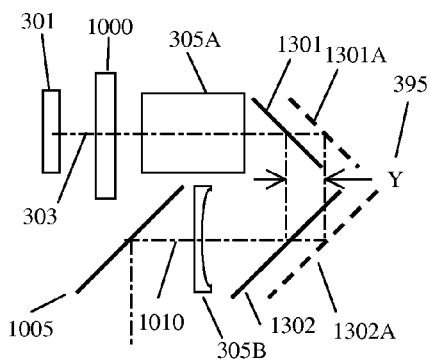
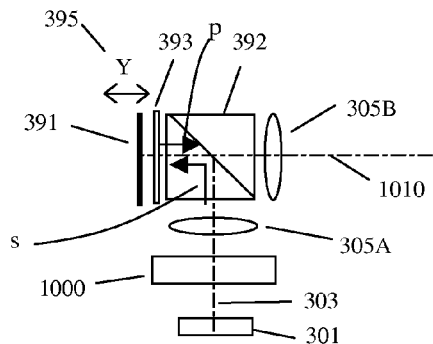
Fig. 11a  Fig. 11b
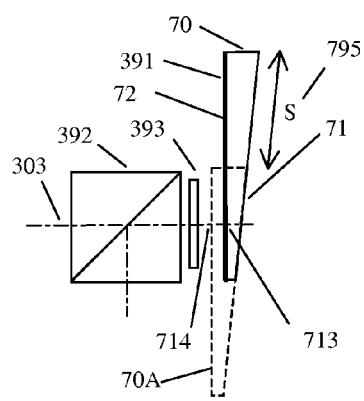
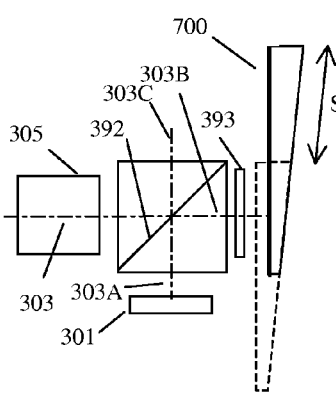
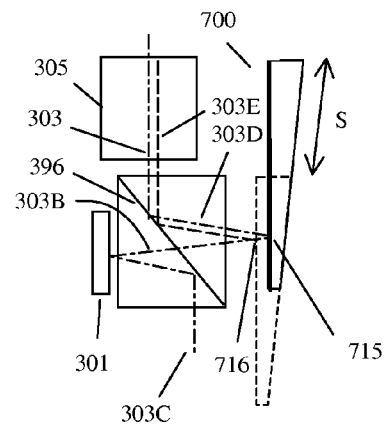
Fig. 12a  Fig. 12b  Fig. 12c
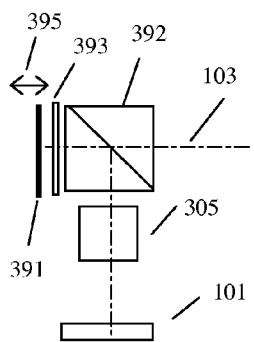
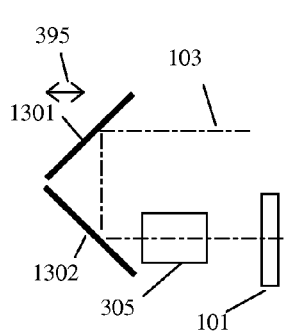
Fig. 13a  Fig. 13b

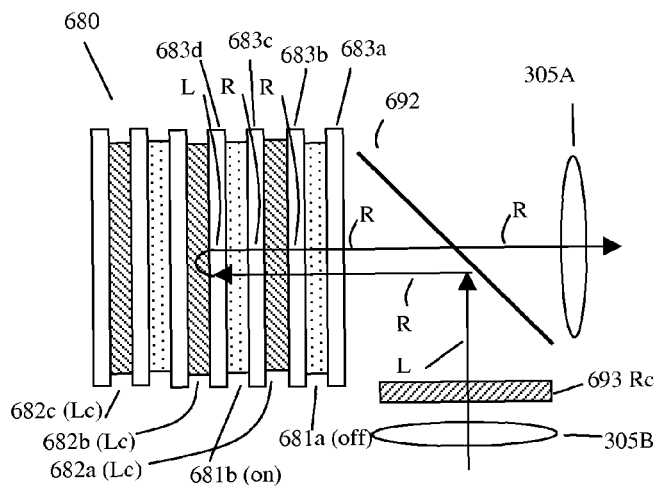
Fig. 16a
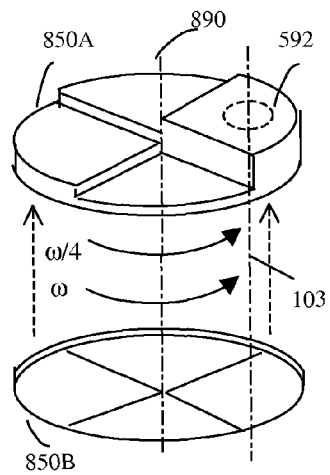
Fig. 16b
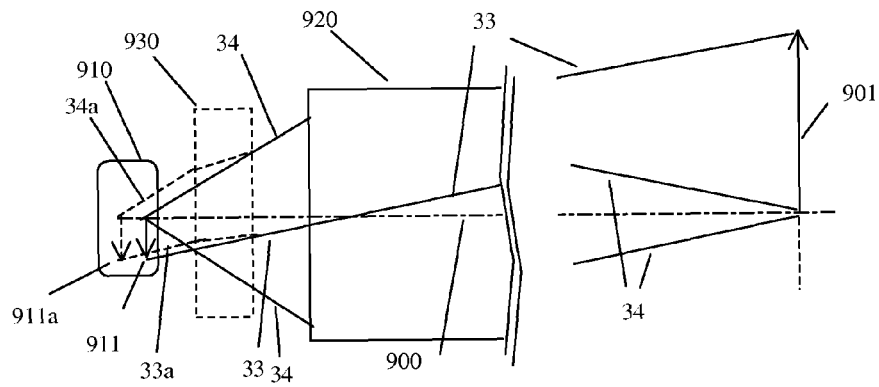
Fig. 17
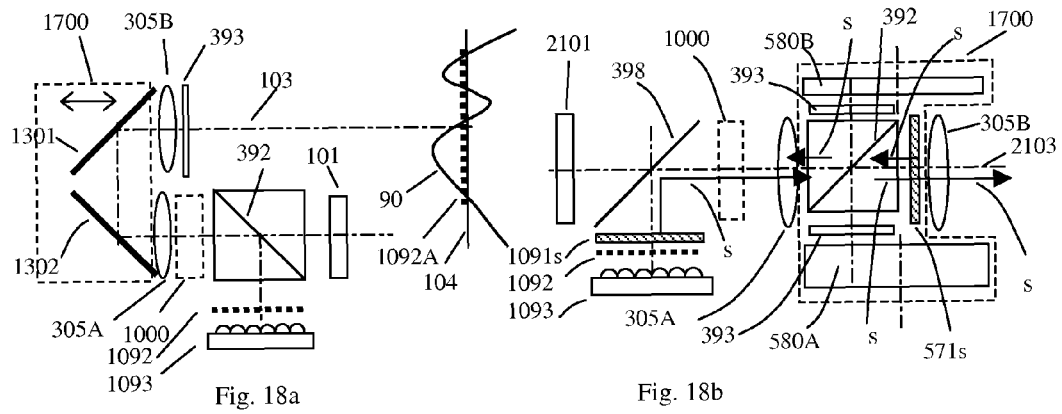
Fig. 18a
Fig. 18b

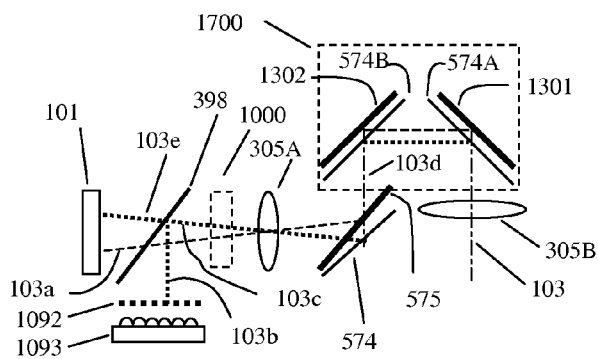
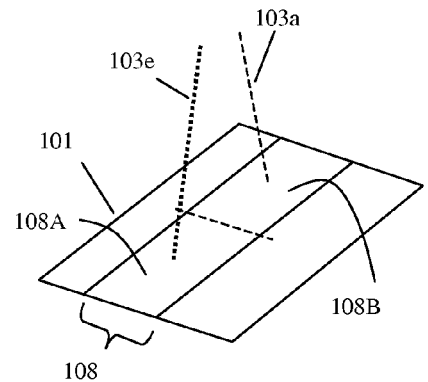
Fig. 19a  Fig. 19b
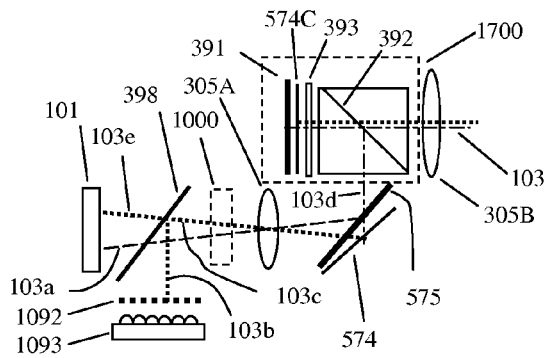
Fig. 19c
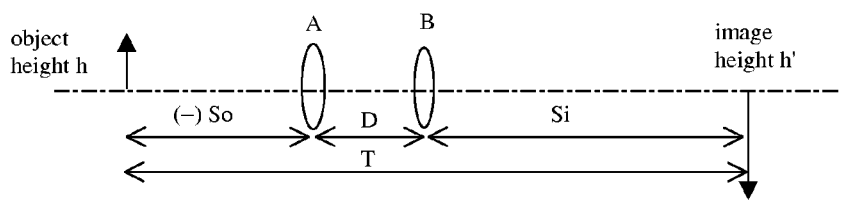
Definition of component locations in the layout of a two-component optical system
Fig. 20

Parameters: W = transparent material thickness, n = refraction index of transparent material (> 1),
So = actual object location, Si = location of image, without the transparent material
So* = effective object location when the transparent material is inserted
Si* = image location when the transparent material is inserted Component locations of Tab. D1 Example 1:
  Solid lines —— computed by first order layout; dashed lines - - - linear approximation Component locations of Tab. D1 Example 3:
Solid lines ⎯⎯ computed by First order layout; dash lines - - - linear approximation Component locations of Tab. D1 Example 4:
Solid lines ⎯⎯ computed by First order layout; dash lines - - - linear approximation

METHODS AND SYSTEMS OF RAPID FOCUSING AND ZOOMING FOR VOLUMETRIC 3D DISPLAYS AND CAMERAS

CROSS-REFERENCE TO RELATED APPLICATIONS AND OTHER DOCUMENTS

This application claims the benefit of prior U.S. provisional application No. 60/995,295, filed Sep. 26, 2007, the contents of which are incorporated herein by reference.

This invention relates to the following US patents by Tsao: U.S. Pat. No. 5,954,414, U.S. Pat. No. 6,302,542 B1, U.S. Pat. No. 6,765,566 B1, and U.S. Pat. No. 6,961,045 B2. This invention also relates to the following co-pending U.S. application by Tsao: application Ser. No. 11/156,792 (claiming domestic priority of provisional application No. 60/581,422 filed Jun. 21, 2004). The above documents are therefore incorporated herein for this invention by reference.

BACKGROUND OF THE INVENTION

This invention relates in general to methods and systems of rapid focusing and zooming for the applications in the projection of volumetric 3D images and in the imaging of 3D objects.

One category of V3D display generates V3D images by rapidly moving a screen to repeatedly sweep a volume and projecting 2D images on the screen. V3D images thus form in the swept volume by after-image effect. One typical mode of motion is to place a screen on a slider-crank mechanism to make the screen move in reciprocation motion. Tsao U.S. Pat. No. 6,765,566 (FIG. 20) describes a system with a screen that reciprocates by a rotary motion, as illustrated in FIG. 1. In principle, this is to revolve the screen 2031 about an axis 2000 and sweep a volume 2040 while keeping the screen surface always facing a fixed direction. For convenience, this is called "Rotary Reciprocating mechanism". The advantage of Rotary Reciprocating mechanism is that a motion equivalent to reciprocation can be generated by smooth rotary motion without the need of linear bearings, which in general have higher cost, higher noise and shorter life than rotary bearings.

Another category of V3D display applies a stack of electrically switchable screens (usually liquid crystal materials) as display means. By quickly and sequentially switching different screens in the stack, a moving screen can be generated. 2D image frames can be projected onto the liquid crystal screen to create V3D images. For example, Sullivan (U.S. Pat. No. 6,100,862, which is incorporated herein for this invention by reference) describes such a system.

In these approaches, one major issue is to project images to the screen (or the liquid crystal screen) and keep the image in focus.

Paek ("A 3D Projection Display using PDLCs", presented at the Conference of the International Society for Optical Engineering, January 29-February 2, San Jose Calif.) uses a piezoelectric material based simple lens for rapid focusing. However, practical projection lens requires multiple lens with certain size in order to provide bright and high quality image. To achieve this by piezoelectric lens can be difficult and costly. By similar reasoning, a vari-focal liquid lens, which can change its focal length by changing the voltage applied over its "electro-wetting" water-oil interface, can also be used. Vari-focal liquid lens is now commercially available (Varioptic of France, see www.varioptic.com). However, for the purpose of projecting bright, high quality image, liquid lens appears to be too small (only 2~3 mm aperture) to pass enough light. And because its principle is based on surface tension between two liquids, it is doubtful that larger lens can be made. Liquid weight becomes more significant for larger lens.

Sullivan (U.S. Pat. No. 6,100,862) uses a varifocal mirror before a projection lens to adjust the focus of projection.

Sullivan (US Pat. Pub. No. 2003/0067421, which is incorporated herein for this invention by reference) describes a vari-focusing projection system. A rotating transparent disk with an azimuthally varying thickness is placed between the projection lens and the image source to change the effective object distance in a fast and periodical fashion. This is based on the principle that a transparent material (of refractive index>1) between lens and object changes (shortens) the effective object distance due to refraction. When effective object distance is shortened, image distance is increased.

However, it is difficult to apply Sullivan's disks to systems with reciprocating screen or "Rotary Reciprocating" screen (of FIG. 1). Sullivan describes basically three types of disk. FIG. 2a illustrates one type that has a thickness varying from the minimum at 0 degree to the maximum at 360 degree. FIG. 2b illustrates another type that has a thickness increasing from the minimum at 0 degree to the maximum at 180 degree and then decreasing back to the minimum at 360 degree. A Rotary Reciprocating screen of FIG. 1 moves back and forth in space. However, the disk of FIG. 2a has a discontinuous shape function with a jump at 201. Therefore, this type of disk can not be used in both directions of the screen motion. This is not desirable. The disk of FIG. 2b has a non-smooth shape function. Near maximum thickness 202, the slope of the disk surface makes a sudden change from 203 to 204. This happens near minimum thickness 205 too. Optically, this sudden slope change deflects the angle of optical path. Therefore, the optical path should not cover both sides of the maximum line 202 (or minimum line 205) at the same time. As a result, a significant portion of the display volume 2040 near top and bottom can not be used to display image. But more importantly, the function of thickness change of the disk is a linear function relative to rotating angle. It does not match the motion function of a screen in slider-crank motion or in Rotary Reciprocating motion (sinusoidal motion) (see Appendix E for the motion functions). Although it is possible to use a combination of rotary motion with a rack and pinion system to turn the disk rotation into a sinusoidal function relative to time, the resulted system can be noisy and complicated. Therefore, the disk of FIG. 2b is also undesirable. The third type of disk is a disk with stair-like surface (FIG. 5A, 5B of Sullivan). Because a stair step must be wide enough to allow projection beam to pass through, a disk of reasonable size can only contain a very limited number of stair steps. As a result, this type of disk is only suitable for displaying a very limited number of frames in the display volume.

In the field of imaging, Fantone et al. (U.S. Pat. No. 6,066,857) (FIG. 22-24) describes a similar vari-focusing imaging system used in a barcode reader. The system uses a rotating transparent disk with a helical surface on one side and a flat surface on the other side. A stationary wedge prism is placed near the flat side to form a small air gap. The rotating disk creates thickness variation. This disk also has a discontinuous shape and is not suitable for a screen that moves back and forth.

Tsao (U.S. Pat. No. 5,954,414) describes several image delivery systems that maintain not only focus but also constant magnification of projected image frames. One system is a moving reflector-pair placed between the projection lens and the moving screen. The moving reflectors compensate the change of optical path length caused by the motion of the screen. Tsao (U.S. Pat. No. 6,302,542) describes another image delivery system comprising a single moving flat reflector (see column 5, lines 1-5, 28-31, 37-39 of the referred patent). The reflector moves by a "Rotary Reciprocating mechanism" (similar to FIG. 1) in synchronization with the screen. However, these systems require certain amount of mechanical parts and take up certain amount of space.

Tsao U.S. Pat. No. 5,954,414 (column 7, line 47 to column 8 line 7) and U.S. Pat. No. 6,302,542 (column 5 line 55 to column 6 line 19) also describe a moving zoom lens system, which keeps the projected image in focus and maintains constant magnification. In general, a zoom lens can be separated into two lens groups. Zooming is achieved by moving the two lens groups separately but simultaneously. One method is using linear stages driven by a microcomputer-controlled servomotor or using cams to adjust the positions of lens groups. Another way to drive the stages is to use piezoelectric actuators. Another method is using lens with adjustable power. U.S. Pat. No. 6,302,542 (column 8, lines 24-55) also describes a "synchronized-focusing projector", which achieves rapid focusing by adjusting lens position or power rapidly. The method also includes changing optical path length by moving a reflector, instead of moving the lens (U.S. Pat. No. 6,302,542, FIG. 6, column 6 line 5-19). The cost of linear stages, control systems and piezoelectric actuators can be significant. A cam driving system can also be complicated to design and can be noisy. Therefore, it is desirable to improve on these approaches.

A rapid focusing system can also be useful in the field of 3D shape imaging and recovery (or sometimes called volumetric measurement). In this field, one category of approach is based on the focus or defocus of multiple 2D images (pictures) of a 3D shape or a 3D scene. In the method of Shape from Focus (or Depth from Focus) (SFF or DFF), multiple 2D images of a 3D surface are taken at different focal depths. Image processing of the 2D images obtains a set of "focus measures" at each image point. The depth of a surface point is then obtained by finding the peak of the focus measure function by Gaussian interpolation of the focus measures. In the method of Depth from Defocus (DFD), depth information is computed by a "defocus function" from the blurred images of areas that are out of focus. The DFD method requires much fewer 2D images. Details of the SFF methods can be found in the following documents:
1. Nayar and Nakagawa, "Shape from Focus", IEEE Transaction on Pattern Analysis and Machine Intelligence, vol. 16, No. 8, August 1994, pp. 824.
2. Noguchi and Nayar, "Microscopic shape from focusing using active illumination", Proc. IEEE Conference on Computer Vision and Image Processing 1994, pp. 147-152.
3. Yun and Choi, "Fast Shape from Focus using Dynamic Programming", in *Three-Dimensional Image Capture and Applications III*, Ed. by B. D. Corner and J. H. Nurre, Proceedings of SPIE Vol. 3958 (2000) pp. 71.

Details of the DFD Methods can be Found in the Following Documents:
4. Watanabe et al., "Real-time computation of depth from defocus", Proc. of SPIE v 2599, 1996, pp. 14-25.
5. Wallack U.S. Pat. No. 6,483,950, "Determining a depth".

The above documents are incorporated herein by reference.

In order to image a 3D object at different focal depths, one can displace the image sensor with respect to the image plane, or move the lens, or move the object with respect to the object plane. In the paper of Nayar and Nakagawa, the 3D object is placed on and moved by a movable stage. The depth map is computed from 10-15 images. In the paper of Yun and Choi, the camera was moved by a motorized or piezoelectric-actuated stage. In Watanabe et al.'s paper, two cameras positioned at different depths were used. The depth map is computed from only 2 image frames. When the range of focal depth change is small, a rotating sector wheel with glass plates of different respective index of refraction is placed before the 3D object to change effective focal distance. This is described in Wallack U.S. Pat. No. 6,483,950. In general, these methods of depth scanning are either slow or unable to cover large depth.

Accordingly, the purpose of this invention is to develop a rapid focusing system that has a simple structure and occupies small space, especially for V3D displays based on reciprocating screen or Rotary Reciprocating screen. This invention is also to develop a focusing system that does not have the shortcomings of the aforementioned rotating disks, that is, discontinuous or non-smooth shape. The purpose of this invention is also to develop a focusing system that can be driven by simple mechanisms and can be easily synchronized with the motion of the moving screen. Further, the purpose of this invention is also to have a system of reasonable cost. This includes using parts that are easy to manufacture and using simple mechanical elements of low cost and high reliability.

A rapid focusing system can be used in a camera system to rapidly scan the image plane or to scan the object plane without moving the camera body. The scanning range can cover large depth and the scanning speed can allow real-time 3D motion capture.

BRIEF SUMMARY OF THE INVENTION

In this invention, rapid variable focusing is achieved by rapid and repeated change of the object distance, or the spacing between lens groups of the projection lens, or both. When the object distance and the spacing between the lens groups are changed simultaneously, the rapid focusing system becomes a rapid zooming system. Rapid zooming not only keeps the projected images in focus but also maintains a constant magnification.

The preferred approaches of changing optical path length include a refractive displacement means and a reflective displacement means. The refractive displacement means is based on movement of one or more thin wedge prisms. By inserting the thin wedge prisms into the optical path, changing their positions relative to the optical path changes the thickness traveled through by the optical path. This results in effective change of optical path length. The thin wedge prisms can move in linear reciprocation motion, in Rotary Reciprocating motion or in rotation.

The reflective displacement means is based on a moving reflector system. Folding an optical path by the reflector system and moving the reflector system can effectively change the optical path length. The preferred reflector system includes a single flat mirror and a pair of reflectors arranged at right angle relative to each other.

For focusing purpose, the amount of change of optical path length can be very small yet has to be precise. This can be achieved by using a wedge-shaped optical device and moving it obliquely relative to the optical path. In terms of kinematics, a larger movement along the plane of one surface of the wedge creates a smaller displacement of the other surface of the wedge. The wedge-shaped optical device can be a thin wedge prism or a mirror on a wedge-shaped base.

In general, the refractive displacement means occupy smaller space as compared to the reflective displacement means. But their range of displacement is smaller than that of the reflective displacement means. The actual amount of change of optical path length required by a rapid focusing system or a rapid zooming system determines which displacement means to use. In general, a rapid zooming system has at least one path requiring large distance change that is more suitable for the reflective displacement means.

Optical layout analysis shows that the changes of the object distance, the spacing between two lens groups and the image distance are almost in proportion and can be correlated by linear relations. Therefore, the same type of motion function can be used to change these three optical path lengths to achieve focusing and constant magnification.

Especially for camera applications, a "discrete" approach can be used. Discrete reflective and refractive means can make rapid discrete change of the optical path length, so that a limited number of 2D image frames at discrete focusing positions can be captured in a short time.

Further, in camera applications, the rapid focusing system can allow an integrated system of structured illumination that uses the same imaging lens to project the illumination pattern. The rapid focusing system can also include a "Divisional Sensor Area" configuration to allow the capture of structurally illuminated image and naturally illuminated image at the same time in the same frame.

BRIEF DESCRIPTION OF THE DRAWINGS

FIG. 7a illustrates means for moving two thin wedge prisms with respect to each other according to this invention. FIG. 7b illustrates means for using a Rotary Reciprocating mechanism.

FIG. 8a-c illustrates means for rapid change of optical path length by "refractive displacement" using two rotating thin wedge prisms according to this invention.

FIG. 9a-b further explains the working principle of FIG. 8a-c.

FIG. 10a-b illustrates means of path shift correction in the method of rotating thin wedge prisms according to this invention.

FIG. 11a-b illustrates means for rapid change of optical path length by "reflective displacement" using a moving reflector system in examples of rapid zooming lens according to this invention.

FIG. 12a illustrates means for rapid change of optical path length by "reflective displacement" using an "obliquely moving reflector" according to this invention. FIG. 12b-c illustrates an "obliquely moving reflector" in examples of rapid focusing system according to this invention.

FIG. 13a-b illustrates means of "compensation of object path length" using moving reflectors for 3D imaging applications according to this invention.

FIG. 16a illustrates a means for rapid change of optical path length by "reflective displacement" using a liquid crystal discrete reflector system according to this invention.

FIG. 16b illustrates a means for rapid change of optical path length by "refractive displacement" using a pair of rotating transparent stair-like disks according to this invention.

FIG. 17 illustrates a means of rapid change of object distance by "refractive displacement" in microscopic 3D imaging application.

FIG. 18a-b illustrates means of integrated a structured illumination system in 3D imaging application according to this invention.

FIG. 19a-c illustrates a "Divisional Sensor Area" configuration for simultaneous capture of structurally illuminated image and naturally illuminated image according to this invention.

FIG. 20 Appendix A's definition of component locations in the layout of a two-component optical system.

DETAILED DESCRIPTION

Figure 21:
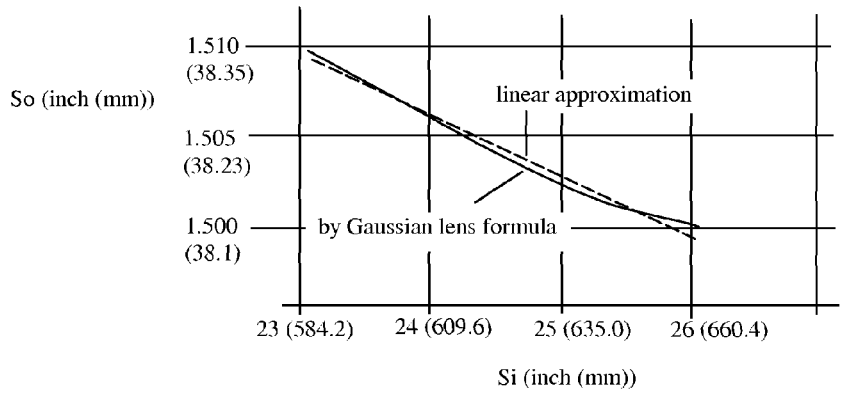
FIG. 21 Appendix B's example of optical design of variable focusing system

In a typical V3D display, a small SLM (spatial light modulator) is used as the image source. The moving screen is large relative to the SLM. That is, magnification is large and Image distance is large relative to object distance. Referring to lens formula equations (A1) and (A2) of Appendix A, when a small object with a small So is projected to a large distance (large Si), a slight change of So creates large change of Si. Appendix B shows an example of projection design for a V3D display. A SLM of 8.75 mm height is projected to form a volume length of 5.625" (142.88 mm). The required stroke (direct distance of screen motion from bottom to top) is 3" (76.2 mm). A projection lens of f=36 mm is used. By lens formula equation (A1), a change of So of only 0.29 mm gives a change of Si of 3" (76.2 mm). For cases of larger magnifications, the required change of So is even smaller. In addition, Appendix B indicates another important observation: the So to Si curve can be approximated by a linear relation, as illustrated in FIG. 21. In short, the above analysis shows that by changing So within a very small range, Si can be changed in a larger range and the change of Si can be approximated by the same type of motion function of So. In other words, the change of So and the change of Si are almost in proportion.

Figure 1:
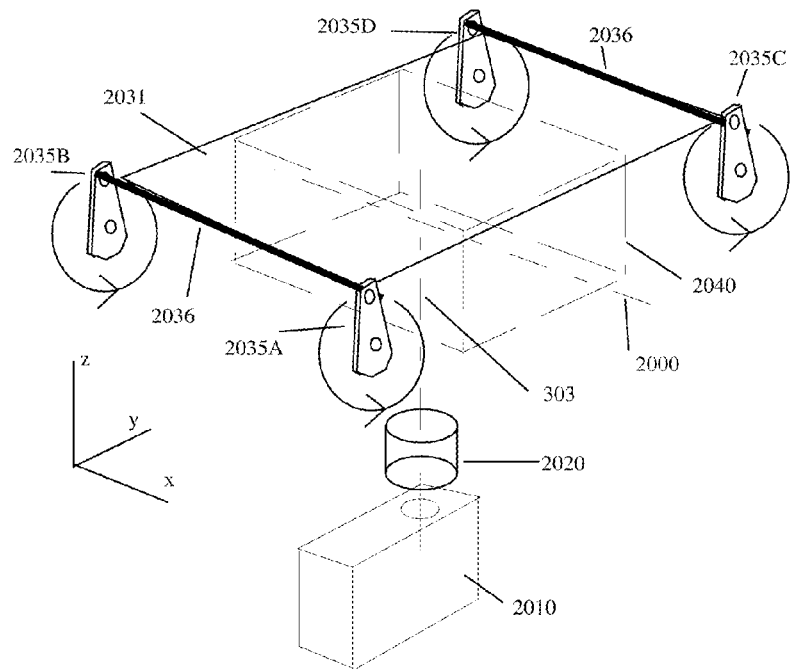
FIG. 1 illustrates a volumetric 3D display system with a Rotary Reciprocating screen in the prior art.
Figure 2A:
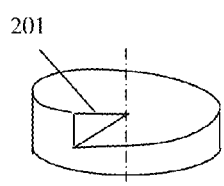
FIG. 2a-2b illustrates transparent disks of varying thickness for variable focusing systems in the prior art.
Figure 2B:
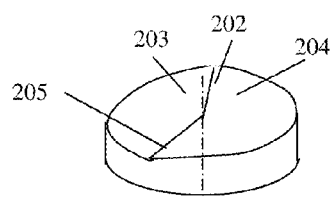
Figure 3A:
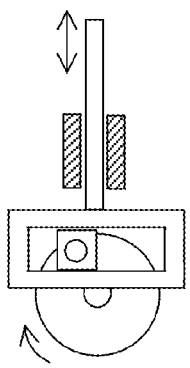
FIG. 3a-3b illustrates a cross-slider-crank mechanism and a cross-slider-eccentric mechanism for generating sinusoidal motion in the prior art.

The position of a Rotary Reciprocating screen (FIG. 1) moves along the projection path 303 as a sinusoidal function relative to time (or Simple Harmonic Motion), when the driving arms 2035A-D rotate at constant speed. Besides Rotary Reciprocation, other conventional mechanisms such as cross slider-crank mechanism (FIG. 3a) or cross slider eccentric mechanism (FIG. 3b) can also produce the same type of sinusoidal motion. However, a screen moving in a slider-crank mechanism has a slightly different motion function. Appendix E describes the geometric analysis of the two types of motion. Since So and Si have an approximate linear relation, So should also change in sinusoidal function or in slider-crank function in order to be synchronized with the motion of the screen in sinusoidal motion or in slider-crank motion.

The first preferred approach to create rapid and repeated change of So is by "refractive displacement". It has been mentioned that placing a transparent material (of refractive index>1) between lens and object and changing the thickness of the material changes effective object distance. Referring to Appendix C, the following equation approximates the relation between the "focus shift" ds and the thickness of the transparent material W:

$$ds/W \sim = 1 - 1/n \qquad (3)$$

where n is refractive index of the transparent material. This relation holds in an optical system having converging rays or diverging rays. This focus shift is the change of optical path length caused by refraction of the inserted transparent material. This change of optical path length is proportional to the thickness of the transparent material. The direction of the change is toward the direction of travel of light (i.e. toward downstream direction).

Applying the design example of Appendix B and assuming a transparent material of n=1.512 (e.g. BK7 glass) is used, in order to produce a change of So of 0.29 mm, the change of thickness is:

$$\Delta W \sim = \Delta So/(1 - 1/n) \qquad (4)$$

$$\Delta W \sim = 0.29 \text{ mm}/(1 - 1/n) = 0.856 \text{ mm}$$

In general, $\Delta W$ is in millimeters to sub-millimeter range.

Figure 4A:
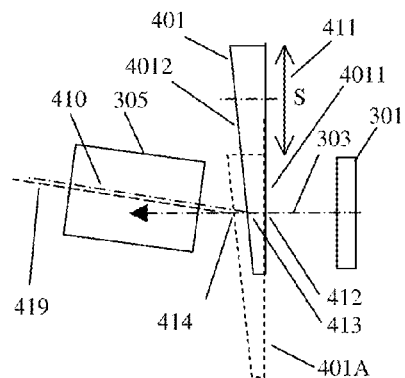
FIG. 4a-c illustrates means for rapid change of optical path length by "refractive displacement" using a moving thin wedge prism in an example of rapid focusing system according to this invention.

Placing a transparent material of varying thickness in the optical path and moving the transparent material with respect to the optical path changes the length of the optical inside the transparent material. Thereby, "refractive displacement" can be achieved. The preferred transparent material is a thin wedge prism. FIG. 4a illustrates the basic idea in side view. The projector system comprises a projection lens 305 and an image source 301, which can be an image panel or a spatial light modulator. The illumination part of the projector is omitted from the figure. A thin wedge prism 401 is a transparent plate that has a finite wedge angle between the two surfaces (4011 & 4012). By inserting the thin wedge prism between the projection lens and the image source to different depth, the centerline 303 passes through different thickness of the transparent material. The motion of the thin wedge prism is along one of its surface 4011. The prism moves back and forth with a motion stroke S 411. When the prism moves from the highest position to the lowest position (i.e. down stroke), the prism thickness on the centerline increases (from 412-413 to 412-414). During the up stroke, the prism thickness on the centerline decreases (from 412-414 back to 412-413). The change of thickness on the centerline and the prism's position in vertical position have a linear relationship. Because the change of thickness is proportional to the change of optical path length (equation (3)), the change of So and the prism's vertical position also have a linear relationship. As a result, the prism's vertical position and Si also have a linear relationship. Therefore, the same type of motion function can drive the wedge prism and the screen.

When the centerline of projection beam 303 strikes one surface (4011) at normal direction, the exit beam 410 is slightly deflected away from the original centerline 303, because of refraction at the exit surface (4012). However, this angle of deflection is fixed regardless of prism position, because the angle of the exit surface does not change. Therefore, this deflection error can be easily corrected by making the new centerline 410 as the centerline of the projection. In addition, because of the thickness change, the location of the exit point of the beam moves from 413 to 414 during one stroke. Accordingly, the exit beam 410 makes a small parallel shift to position 419. But, because the thickness change is very small, this shift amount is even smaller. The resulted position shift on the screen is also small and can be predetermined and then corrected by a small shift of image content on the SLM.

Figure 4B:
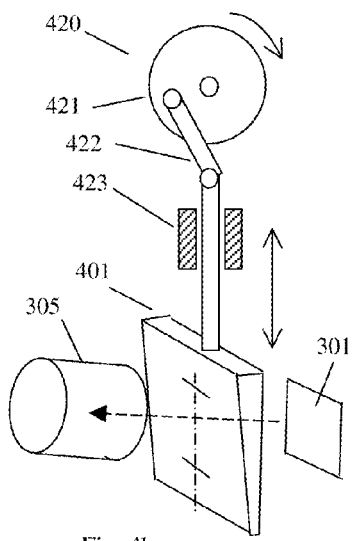
Figure 4C:
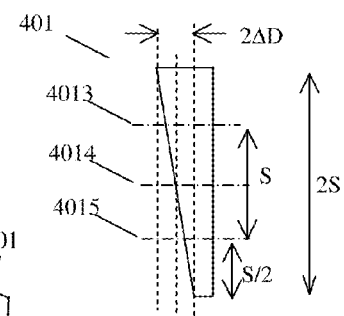

FIG. 4c illustrates an example design of the thin wedge prism in side view. The motion stroke can be set to a number S that is roughly equal to or smaller than the diameter of the projection beam. The height of the prism is 2S. During the motion strokes, the centerline of projection moves between location 4013 and 4015. If the desired thickness difference between 4013 and 4015 is $\Delta W$, then the wedge angle can be determined from $\Delta W$ and S.

In order to generate the motion, one typical approach is to use a slider-crank mechanism 420, which includes a crank wheel 421, a sliding stage 423 carrying the prism, and a connecting rod 422 linking the crank and the sliding stage, as illustrated in FIG. 4b. Accordingly, the screen motion should also be of slider-crank type for best result.

Figure 5A:
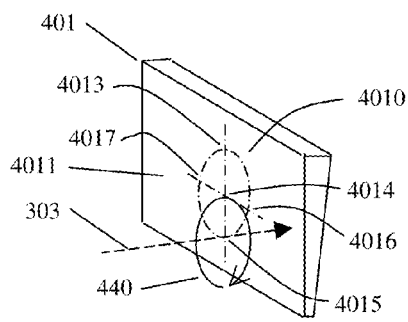
FIG. 5a-b illustrates means of moving a thin wedge prism by Rotary Reciprocating motion according to this invention.

If the screen (Si) moves in sinusoidal function, then the thickness of the transparent material should change in sinusoidal function as well. The motion can be achieved by moving the prism in "rotary reciprocating" motion. FIG. 5a explains this motion mode. The prism revolves about the centerline of projection 303 in a circular motion 440. However, the orientation of the prism does not change during the revolution. That is, the prism does not rotate about its own center 4014. Due to this revolution, centerline 303 traces a circle 4010 on the surface 4011 of the prism. In one revolution, the centerline passes the following points on the circle in sequence: 4015, 4017, 4013 and 4016. As a result, the prism appears to reciprocate between 4013 and 4015 in side view of FIG. 4c. Therefore, the vertical displacement of a "rotary reciprocating wedge prism" is sinusoidal (See Appendix E).

Figure 5B:
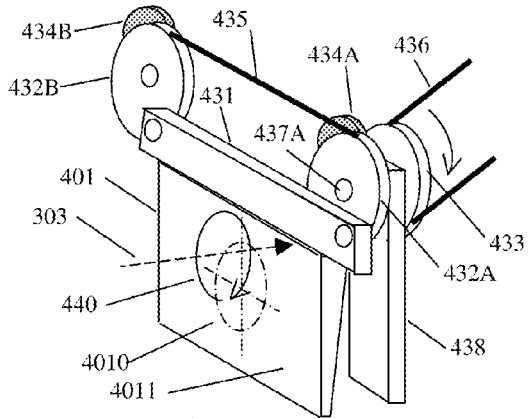

FIG. 5b illustrates an example of mechanism for the rotary reciprocating wedge prism. It has a pair of rotary arms 432A and 432B, which are also timing gears linked by a timing belt 435. A connecting rod 431 connects the two rotary arms. A third timing gear 433 is mounted to the same axis 437A of rotary arm 432A. Driving belt 436 drives the rotary arms. The arms rotate in unison and the connecting rod moves in "rotary reciprocating" motion. The wedge prism is mounted to the connecting rod such that the rotary reciprocating motion is on a plane parallel to one surface of the wedge prism. Counter weights (434A & 434B) are attached to the rotary arms to balance the centrifugal force caused by the rotation of the prism and the connecting rod. The motion is therefore smooth and vibration is minimized. Driving gear and belt (433 & 436) are linked to the driving mechanism of the screen so that the prism motion is synchronized to the screen motion. When the screen is at top (maximum Si), the prism is at bottom (maximum thickness). When the screen is at bottom, the prism is at top. One revolution of the screen matches one revolution of the wedge prism.

Figure 6A:
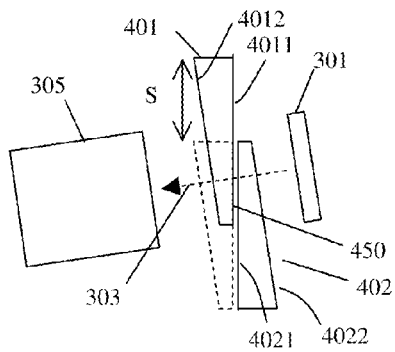
FIG. 6a illustrates means for rapid change of optical path length by "refractive displacement" using two thin wedge prisms according to this invention.

FIG. 6a illustrates a "dual wedge prisms" approach that eliminates the deflection of projection beam (410 of FIG. 4a) and possibly related errors. A second wedge prism 402 is inserted into the projection path in proximity to the moving wedge prism 401. One surface 4021 of the second prism is aligned in parallel surface 4011 of the moving prism and forms a small air gap 450 with surface 4011. The second prism does not move. Therefore, the width of the air gap is fixed. The second wedge prism has the same wedge angle as the moving wedge prism. The second wedge prism is oriented such that the two outside surfaces of the two prisms, 4012 and 4022, are always parallel. The projection centerline 303 is oriented to intersect both outside surfaces at normal direction.

Further, both prisms can be made to move, instead of only one. FIG. 7*a* illustrates the idea. The two prisms move in exactly the same motion but in opposite directions. Because two wedge prisms contribute to thickness change simultaneously, the motion stroke is reduced by ½, if the same wedge prisms are used. Accordingly, the sizes of the rotary arms and the wedge prisms can be reduced too. This eases actual implementation and further reduces vibration.

FIG. 7*b* illustrates an example of embodiment of a dual moving wedge prism system. Basically, it includes two rotary reciprocating mechanisms of FIG. 5*b*, one for each moving prism. The pair of rotary arms of each rotary reciprocating mechanism is mounted to the same pair of axes (437A & 437B), which are mounted to a base 702 by using rotary bearings. Therefore, the motion of the two rotary reciprocating mechanisms is linked together. In FIG. 7*b*, the wedge prisms are placed at one end of the mechanism, instead of at the middle. Counter weights 701 are used to maintain the mass center at the correct position. The two wedge prisms (with their corresponding connecting rods and counter weights) are placed to the rotary arms with a phase difference of 180°. This not only provides the required relative motion between the two wedge prisms but also provides balanced centrifugal forces during rotation.

Another way to create thickness variation is to rotate the wedge prism(s). FIG. 8*a* illustrates a thin wedge prism in the form of a circular disk 401F, in perspective view. The prism rotates about axis 601, which passes its center 4014. When the prism rotates, the projection beam's centerline 303 travels a circular track 4010 and passes through the following points in sequence: 4015, 4016, 4013 and 4017. The change of thickness on centerline 303 is basically the same as the situation of FIG. 5*a*.

In order to eliminate the deflection of projection beam, a second rotating wedge prism 402F is added to form a "dual wedge prisms" configuration. FIG. 8*b* and 8*c* illustrate the idea in perspective view. Prism 402F is identical to prism 401F. Prism 402F rotates around axis 602. Axis 602 is parallel to axis 601. The two prisms rotate in the same direction at the same speed (511 & 611). Entering from opposite directions, they intercept the image beam 303 with part of their surface areas. The inner surfaces of the two prisms form a parallel air gap. Yet, the two prisms are oriented with a phase difference of 180 degree. That is, when the thinnest part of 401F passes centerline 303, the thinnest part of 402F also passes centerline 303, as shown in FIG. 8*b*. To illustrate this phase relation, black dots 610 indicates the thickest part of the prisms. FIG. 8*c* shows the two prisms rotating 90 degrees from the position of FIG. 8*b*. As a result, the outer surfaces of the two prisms are always parallel.

FIG. 9*a* shows a close-up view around the projection beam 303. The two prisms rotate 180 degree from the position of FIG. 8*b* and have their thickest parts aligned together. If only one wedge prism is used, the exit beam deflects as 410A. With the second prism 402F, the exit beam is corrected and becomes 620A, which is parallel to the original centerline 303. There is a small position shift between 620A and centerline 303. Because the orientation of the outside surfaces (4012 and 4022) changes as the prisms rotate, this small position shift also rotates. Further, because the total thickness of the two prisms changes when they rotate, the amount of this small position shift also changes. In FIG. 9*a*, the total thickness of the prisms is maximum and the exit beam 620A shifts below centerline 303. In FIG. 9*b*, the total thickness is minimum and the exit beam shifts above centerline 303 by a smaller amount 620B. However, the amount and the orientation of this shift can be pre-determined from the geometry of the two wedge prisms and their rotation angles. Therefore, this shift can be corrected by a compensation of displacement of the image content on the SLM toward the opposite directions. In other words, with such compensation, a pair of two rotating wedge prisms can achieve the goal of "refractive displacement". This "dual rotating thin wedge prisms" method generates a thickness change of sinusoidal function, matching screen motion of sinusoidal type.

If desired, a second pair of rotating wedge prisms can be added to eliminate the shift. As illustrated in FIG. 10*a*, this second pair (401B & 402B) is identical to the first pair except that it is oriented as a mirror image with respect to the first pair. As a result, refraction in the second pair of prisms brings the shifted projection beam 620 back to the original centerline 621. In practice, 401F and 401B can be mounted on one shaft. 402F and 402B can be mounted on another shaft. The two shafts can be driven by a timing belt/gears system. In this 4-prism system, 4 prisms contribute to thickness change. Each prism thus provides a maximum thickness difference of ΔW/4.

Another way to eliminate the shift is to use a mirror, as shown in FIG. 10*b*. Mirror 221 placed after the pair of rotating wedge prisms reflects the shifted beam 620 back to the prism pair. Optically, this is similar to the 4-prism system of FIG. 10*a*. A polarization beam splitter (PBS) 392 and a quarter wave plate 392 are required to separate the path from the SLM 621 and the path leading to the projection lens. The projection beam 303 is polarized.

The "refractive displacement" methods described above do not maintain constant magnification. Therefore, the resulted display space has trapezoidal sides. Because the geometry of the display space is fixed and can be pre-determined, images can be pre-scaled before projection so that the resulted V3D image can be displayed with minimum distortion.

Figure 3B:
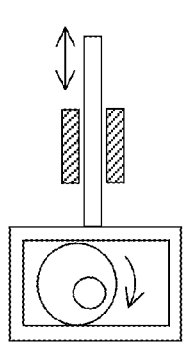

In case a constant magnification is desired, then a moving zoom lens is needed. In a zoom lens configuration, the two movable lens groups are called variator and compensator respectively. The variator's main function is adjusting magnification. The compensator's main function is focusing. This is according to the descriptions in the following reference: E. Betensky "Zoom lens principle and types", in *Lens Design*, ed. by W. J. Smith, SPIE Optical Engineering Press, Bellingham, Wash., 1992, p. 88. Appendix D outlines the optical design of a moving zoom lens and describes an example design for the purpose of V3D display. In general, as shown in Appendix D, when the image distance (Si) is not too large, the compensator is in the rear (close to SLM) and the required displacement is smaller than a few millimeters. Therefore, the focusing systems described previously can be used. However, the required displacement of the variator is in the range of several centimeters. In the conventional approach, the variator can be moved directly in reciprocating motion by using a slider-crank mechanism, a cross-slider-crank mechanism (FIG. 3*a*) or a cross-slider-eccentric mechanism (FIG. 3*b*). However, if the variator size is significant, direct driving by these mechanisms can involve significant vibration and noise. Complicated counter balancing and vibration damping mechanisms may be needed.

Figure 3C:
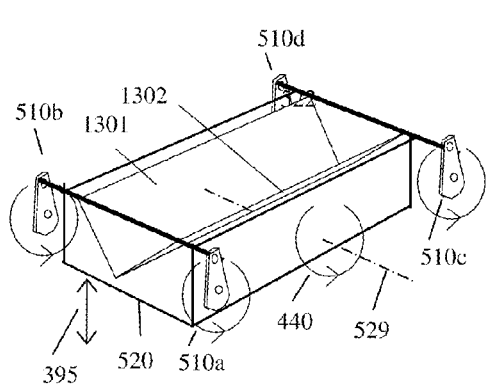
FIG. 3c illustrates a reflector system driven by the Rotary Reciprocating mechanism in the prior art.

Alternatively, the preferred approach is to keep the variator physically fixed and adjust the optical path length between the variator and the compensator. FIG. 11a illustrates the basic concept of a preferred approach in side view. Lens group 305A (compensator) and variator 305B form the zoom lens. A pair of reflectors 1301 and 1302 (placed at 90° with each other) folds the optical path between the compensator and the variator by 180°. That is, the exit path 1010 is parallel to path 303. Moving the reflector-pair together between position 1301 & 1302 and position 1301A & 1302A by distance Y (395) changes the optical path length between the compensator and the variator by 2Y. The zoom lens can be designed to have enough space between the compensator and the variator in order to accommodate the insertion of the reflector-pair. A focusing system 1000 is placed on the path of the object distance. FIG. 3c illustrates a preferred mechanism for driving the reflector-pair 1301 & 1302. This is a "Rotary Reciprocating reflector system" described in Tsao U.S. Pat. No. 6,302,542 (FIG. 5b), which is similar to the screen driving mechanism of FIG. 1. Therefore, the Y motion can be easily synchronized to the screen motion of FIG. 1. If the screen is in slider-crank motion, then the reflector-pair can be moved by a slider-crank mechanism as well. Similarly, the motion in the focusing system 1000 should have the same type of motion function.

If the projector system generates polarized images, then a single flat reflector can be used to adjust the spacing between the variator and the compensator. FIG. 11b illustrates such an example. The projection path 303 leaves the SLM as s-polarized light. After passing through lens group 305A, the projection beam is reflected toward the moving reflector 391 by the PBS 392. Due to the effect of the quarter wave plate 393, the outgoing beam 1010 becomes p-polarized. By moving reflector 391 by a distance Y, the optical path between the compensator and the variator changes by 2Y. Similar to the example of FIG. 11a, the single moving reflector 391 can be driven by a rotary reciprocating mechanism or by a slider-crank mechanism.

In FIG. 11b, the direction of motion of the reflector 391 is parallel to the direction of projection path. An alternative method is to move the single flat reflector at an oblique direction. FIG. 12a illustrates the idea in side view. The single flat reflector 391 is on one surface 72 of a wedge shaped base 70. The projection path 303 intersects the surface of the reflector at right angle. But the base (carrying the reflector) moves along the plane of the other surface 71 of the wedge, as indicated by 795. That is, the reflector moves obliquely relative to the projection path. For convenience, this is called "obliquely moving reflector". In the side view, when the wedge moves by a distance S 795 (from 70 to 70A), the reflector surface moves by a distance from 713 to 714, which is (S sin α) (α is the wedge angle). That is, a translation along the oblique plane generates a comparatively small displacement of the reflector along the optical path. The obliquely moving reflector can be driven by a rotary reciprocating mechanism to generate a path change of sinusoidal function. It can also be driven by a slider-crank mechanism to generate a path change of slider-crank function.

In summary, the preferred moving zoom lens system comprises a moving reflector system between the compensator and the variator and a focusing system on the path of object distance. The moving reflector system adjusts the (optical) distance between the compensator and the variator. The focusing system adjusts object distance (So). The moving reflector system can be a moving reflector-pair (FIG. 11a), a single moving reflector (FIG. 11b), or an obliquely moving reflector (FIG. 12a). The preferred focusing system is the moving wedge prisms system. Optical layout analysis (Appendix D) shows that the changes of the object distance, the spacing between two lens groups and the image distance are almost in proportion and can be correlated by linear relations. Therefore, the same type of motion function can be used to change these three optical path lengths to achieve focusing and constant magnification.

Tab. 1 shows an example design of a moving zoom lens for a V3D display. The magnification and the screen motion stroke are set according to the example in Appendix B. The change of object distance (ΔSo) is 1.11 mm. The change of distance between the compensator and the vatriator (ΔD) is 28.21 mm.

TABLE 1

Example of moving zoom lens design (Assuming magnification m = −16.33, stroke (Si variation) 76.2 mm, component focal length fA = 36 mm, fB = −150 mm) by 2-component first order layout formula of Appendix A (all unit in mm)

|  | Si | D | So | T |
|---|---|---|---|---|
|  | 360 | 103.02 | −43.51 | 506.52 |
|  | 436.2 | 74.81 | −44.62 | 555.63 |
| difference | 76.2 | 28.21 | 1.11 | 49.11 |

If the object distance is large enough, the obliquely moving reflector system of FIG. 12a can also be used as the focusing system. This is another preferred approach "reflective displacement" of for creating rapid and repeated change of So. FIG. 12b illustrates an example that uses a PBS with the obliquely moving reflector 700. If the SLM is of reflective type, then the illumination beam comes from the direction 303C. FIG. 12c illustrates another example that uses a TIR (total internal reflection) prism 396 with a reflective SLM 301. The illumination beam comes from direction 303C. The beam reflected from the SLM (303B) passes the TIR air gap and reaches the obliquely moving reflector 700. The beam forms a finite angle with respect to the beam reflected off the obliquely moving reflector (303D), so that the latter is reflected at the TIR surface 396 and reaches the projection lens 305. Because of this finite angle, when the reflector moves from 715 to 716, the centerline 303 of the exit beam makes a parallel shift to 303E. Similar to the situation of FIG. 4a, because the thickness change is very small, this shift is also small. This shift can be predetermined and then corrected by a small shift of image content on the SLM.

Take note that the oblique moving reflector (FIG. 12a) and the moving thin wedge prism (FIG. 4a) applies the same principle in kinematics. Both devices have a wedge-shaped configuration. A larger movement along the plane of one surface of the wedge creates a smaller displacement of the other surface of the wedge. This is advantageous in terms of mechanical complexity and costs, especially when the required reflector displacement is small. This is because it is easier to make a precise wedge angle and a mechanism of normal size than a mechanism of very small and very precise stroke. Another advantage is that the displacement of the reflector can be adjusted by changing the wedge angle without changing the motion mechanism. In practice, this is to make a base with an adjustable wedge angle. The thin wedge prism is also easier to make than the disk of helical surface or other shapes.

If So is fixed and only D is allowed to change, then a moving zoom lens of two lens groups becomes a variable focusing system. Appendix D Tab. D2 shows an example.

For applications in imaging, the rapid focusing and zooming systems are used in similar ways except that light travels in reversed direction. The object space of the projector becomes the image space of the camera. An image sensor replaces the SLM. The image space (display space) of the volumetric 3D display becomes the object space of the "volumetric 3D camera". In stead of projecting multiple image frames from the SLM to the moving screen, the volumetric 3D camera captures multiple image frames from the object space onto the image sensor. Because of the principle of reversibility, object and image (and So and Si) are really interchangeable. For convenience and in order to match the formula of Appendix A, in this specification, the image sensor of the camera is placed at left side of FIG. 20. That is, So represents image distance and Si represents object distance in a camera system. In this way, all other parameters and formula in Appendix A can still be used directly.

In general, maintaining constant magnification is not absolutely necessary in applications of volumetric 3D imaging. Variations of magnification may be corrected in image processing stage. However, it is preferred to have an optical system that provides constant magnification for the methods of SFF and DFD. In the paper of Nayar and Nakagawa (an SFF method), the image sensor and the lens are fixed. The object is moved by a stage such that the image plane "scans" the object. As a result, surface points of the object with best focus in every image frame have the same magnification. Surface points near those points with best focus also have about the same magnification. Accordingly, two types of scan can be used with this type of SFF method.

The first type is "compensation of object path by a moving reflector system". This approach keeps all parameters (Si, D and So) unchanged. By using a moving reflector system placed after the imaging lens, the object plane can be moved without moving the camera body. FIG. 13*a* illustrates a preferred system of a single moving reflector. This drawing is similar to FIG. 11*b*, except that the moving reflector system is placed after the lens 305, not in the spacing between the lens groups. FIG. 13*b* illustrates another preferred system. This system uses a moving reflector-pair (1301 and 1302) similar to FIG. 11*a*. Both the moving reflector-pair and the moving single flat reflector can be driven by the preferred "Rotary Reciprocating mechanism". These systems are basically the "image delivery systems" of volumetric 3D displays described in Tsao (U.S. Pat. No. 5,954,414) and Tsao (U.S. Pat. No. 6,302,542). Here, the systems are applied in reversed direction for imaging purpose. The optical effect of these systems is equivalent to the movable object stage of Nayar and Nakagawa. Further, these systems can be used to capture images of objects that can not be placed on a moving stage.

The second type is "scanning object plane by a moving zoom lens system". The moving zoom lens system described previously can be used in the 3D camera system to maintain a constant magnification. The image plane can be kept always on the image sensor, while the object plane scans across the object. The effect is similar to the movable object stage of Nayar and Nakagawa. Further, by using the moving zoom lens, the camera can have a deep scan range at large distance.

Figure 14:
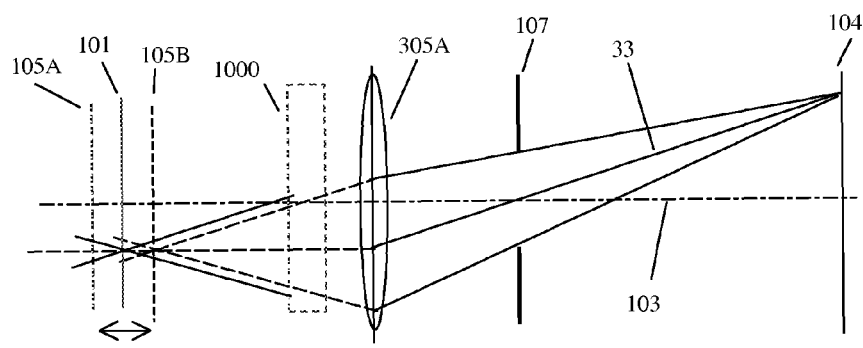
FIG. 14 illustrates means of rapid focus change in a DFD imaging system.

In the paper by Watanabe et al. (a DFD method), the camera uses an aperture 107 placed at the front focal plane of the lens, as shown in FIG. 14. The light ray 33 passing the center of the aperture becomes parallel to the optical axis 103. In other words, the image space becomes telecentric and the magnification is constant. Accordingly, this type of DFD method uses another type of scan: "scanning image plane by a rapid focusing system with a telecentric setup". This is to insert an optical path length changing system at position 1000. The rays on the object side do not change, yet the optical path length changing system displaces the image plane and makes the image plane to scan across the image sensor 101 between positions 105A and 105B. The optical effect is equivalent to the displaced cameras used in the paper of Watanabe et al. In addition, by scanning the image plane, images at more positions can be captured. Although, in principle, 2 images are enough to reconstruct the depth map, in order to obtain more details of the image, such as textures and colors, more images can be helpful. The optical path length changing system can use the previously described "refractive displacement means" or "reflective displacement means", including the moving thin wedge prism and the obliquely moving reflector.

Figure 6B:
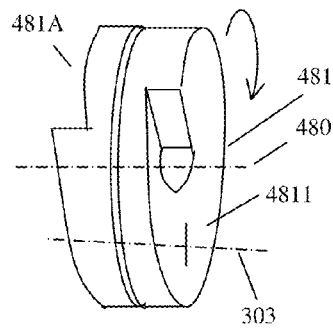
FIG. 6b illustrates preferred means for rapid change of optical path length by "refractive displacement" using two transparent disks with helical surface.

In the applications of 3D camera, the scanning motion of the focusing and zooming system does not have to be back and forth. Therefore, the rotating disk with a helical surface of Fantone et al. (U.S. Pat. No. 6,066,857) described in the background section could be used as a "refractive displacement means". However, it should be noted that any portion of a helical surface having a finite area is not really a "flat" surface, but a slightly twisted surface. This may not be a problem for a barcode reader because the image is of "bar" shape. But this can cause distortion in full frame 2D imaging. To eliminate the distortion, a matching helical shape should replace the stationary wedge prism placed at the back of the helical disk. The simplest solution is to use an identical helical disk (or a portion of it). FIG. 6*b* illustrates the setup. Disk 481 has a helical front side 4811. The backside is flat. An identical disk 481A is placed near disk 481 to form a small parallel air gap with the back of disk 481. Such a focusing system can also be used in a volumetric 3D display that uses a rotating helical screen or a rotating spiral screen.

Previously described optical path length changing means creates continuous changes. However, as already pointed out, in the method of Depth from Defocus, it is possible to reconstruct the 3D image of an object from a limited number of picture frames taken at discrete focus positions. By reducing the number of picture frames, the rate of scan can be increased to capture high-speed 3D motions. For this purpose, means for fast but discrete focusing and zooming are preferred. There are two preferred approaches: "discrete reflector system" and "discrete refractive system".

Figure 15A:
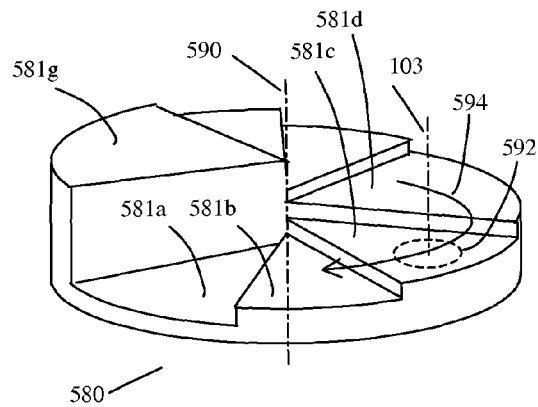
FIG. 15a-d illustrates means for rapid change of optical path length by "reflective displacement" using rotating discrete reflector units according to this invention.
Figure 15B:
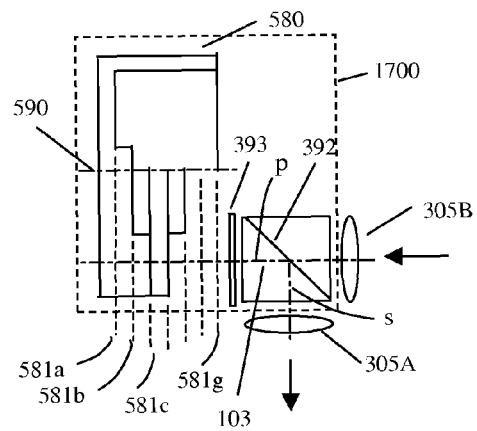

FIGS. 15*a* and 15*b* illustrate a preferred embodiment of the discrete reflector system. The discrete reflector 580 has stair-like reflective surfaces. Each stair step (581*a*, 581*b* . . . 581*g*) is parallel to one another but has a different elevation (thickness). The disk rotates around its centerline 590. The optical path 103 strikes the disk at a position off the rotating centerline 590. Therefore, the imaging beam 592 travels circularly 594 along different reflective steps. FIG. 15*b* illustrates the discrete reflector in a moving reflector system similar to FIG. 11*b*. If the step distance is d, then one step creates a path length difference of 2d. Alternatively, the discrete reflector does not have to be an integral body. It can be a wheel carrying individual reflectors of different thickness (elevation).

Figure 15C:
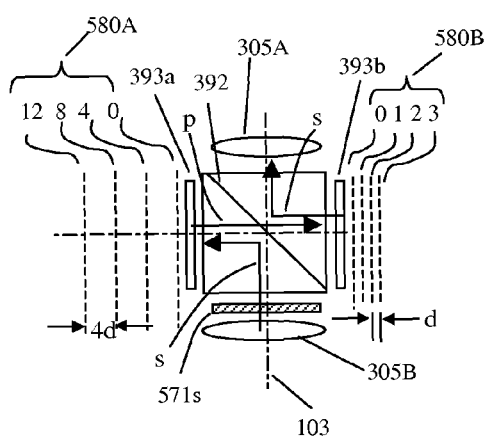

FIG. 15*c* illustrates a dual-unit system that has the advantage of creating more discrete positions and of increasing sensor exposure time at each position. Using a single disk of stair-like reflectors, it needs M steps to create M different positions. In a dual-unit, a unit of M reflector steps and a unit of N reflector steps are combined to create M×N different reflector positions. This is illustrated in the example system in FIG. 15*c*. Two stair-like reflector disks are placed on opposite sides of a polarization beam splitter 392. 580A illustrates the first stair-like reflector disk that has 4 reflector steps (indicated by index 0, 4, 8 and 12). 580B illustrates the second stair-like reflector disk that has 4 reflector steps (indicated by index 0, 1, 2 and 3). The spacing between adjacent steps in the second disk is d. The spacing between adjacent steps in the first step is 4d. The combination is shown in Tab. 2. Index a, b . . . p represents time sequence, which is also angular sequence of the disks. Each number in the 2nd row represents index of the reflector step of the first disk that moves into imaging path 103. Similarly, the 3rd row is of the second disk. The reflector step index also represents the actual amount of reflector position change (in terms of d) caused by that step. The 4th row is the total reflector position change in terms of d.

TABLE 2

Discrete reflector system, dual-unit combination, ref. FIG. 15c.

|      | a | b | c | d | e | f | g | h | i | j | k | l | m | n | o | p |
|------|---|---|---|---|---|---|---|---|---|---|---|---|---|---|---|---|
| 580A | 0 | 0 | 0 | 0 | 4 | 4 | 4 | 4 | 8 | 8 | 8 | 8 | 12 | 12 | 12 | 12 |
| 580B | 0 | 1 | 2 | 3 | 0 | 1 | 2 | 3 | 0 | 1 | 2 | 3 | 0 | 1 | 2 | 3 |
| total | 0 | 1 | 2 | 3 | 4 | 5 | 6 | 7 | 8 | 9 | 10 | 11 | 12 | 13 | 14 | 15 |

Optically, a linear polarizer 571s converts the incoming beam into s-state. The polarization beam splitter reflects the s-polarized beam to the first disk. A quarter wave plate 393a turns the beam reflected from the first disk into p-state, which can pass the polarization beam splitter. The second quarter wave plate 393b turns the beam reflected from the second disk into s-state, which reflects at the PBS and reaches lens 305A.

Tab. 2 also shows that when the first disk rotates 1 turn (0-4-8-12), the 2nd disk rotates 4 times of 0-1-2-3). In practice, gears or timing belts/gears can be used to maintain the speed and phase relation between the two disks. As a result, a total of 4×4=16 different reflector positions can be created. If using only one disk, it needs 16 reflector steps to create 16 positions. Using 4-step disks, instead of 16-step disk, can reduce disk size and increase exposure time at every reflector position. This is further explained in FIG. 15d. The angular spacing between 561b and 561c represents the width of one step in a 16-step disk. The actual range available for exposure, between 5613 and 5614, is only a small fraction of the step width, because the whole beam's cross-section 592a must be within the same reflective surface during the exposure. If the disk has only 4 steps, then the step width is from 561a to 561b. This space allows larger beam cross-section 592b and longer exposure time (between 5611 and 5612).

The second preferred embodiment of the discrete reflector system comprises a switchable multi-layer liquid crystal reflector unit. By applying a different voltage, one of the multiple reflective layers can be turned on. Buzak U.S. Pat. No. 4,670,744 and "A Field-sequential Discrete-Depth-Plane Three-Dimensional Display", *SID International Symposium* v. 16 1985, p. 345 (SID 85 Digest) describe this type of switchable multi-layer reflector unit. The two documents are incorporated herein for this current invention by reference. FIG. 16a illustrates a preferred embodiment in a system similar to FIG. 11b. The switchable reflector unit 680 comprises of multiple layers of glasses (683a, 683b . . . ) and has two types of liquid crystal layer sandwiched between the glasses in alternating sequence. Layers 681a, 681b . . . etc. are layers of switchable half-wave retarder. A switchable half-wave retarder can be a π cell (as described by Buzak) or a ferroelectric liquid crystal (FLC) cell (Displaytech of Longmont, Colo. provides single cell products). The cell can be switched electrically. Layers 682a, 682b . . . etc. are layers of helix chiral cell. The helix chiral cell is not switchable. It is either Left-handed (Lc) or Right-handed (Rc). The imaging beam comes in from lens 305B. The beam first passes a Right-handed helix chiral cell (Rc) 693 and becomes left circularly polarized (L). At a 45-degree dielectric reflector 693, the beam is reflected 90 degree and is turned into right circularly polarized (R). The first layer of switchable half-wave retarder 681a is switched off. All layers of helix chiral cell are Left-handed. Therefore, the R-state beam passes through layer 681a and 682a and maintains the R-state. The 2nd layer of switchable half-wave retarder 681b is turned on. Therefore, the beam passes this layer and becomes left-circularly polarized (L). The next layer, a Left-handed helix chiral cell reflects the left-circularly polarized beam. The beam passes the 2nd layer of switchable half-wave retarder 681b (which is on) the 2nd time and is rotated back to R-state. The R-state beam can then move out of the unit and passes dielectric reflector 692 to reach lens 305A. In summary, by turning on only one switchable half-wave retarder layer, the imaging beam reflects after that layer.

When desired or convenient, a stair-like reflector and a switchable multi-layer reflector system can be combined.

The "discrete refractive system" changes the thickness of the transparent material discretely. The first preferred embodiment comprises a stair-like transparent disk. The disk looks exactly similar to the stair-like reflector disk 580 of FIG. 15a, except that the disk is transparent. Different stair steps provide different thickness. Sullivan US Pat. Pub. No. 2003/0067421 describes such a disk used in a vari-focusing projection system. Alternatively, Fantone U.S. Pat. No. 6,066, 857 (FIG. 10) describes a wheel with plano parallel plates of different thickness. These documents are incorporated herein for this current invention by reference.

Figure 15D:
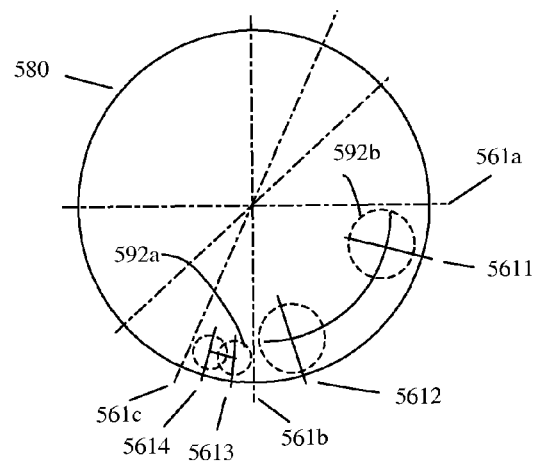

For the same reason explained in FIG. 15d, instead of using a single disk, combination of multiple disks can reduce disk size and increase exposure time in each thickness combination. FIG. 16b illustrates a dual-disk system. The two disks, 850A and 850B, are placed on the same axis 890. Their flat back surfaces face each other and form a parallel small air gap. The first disk 850A has 4 different steps with thickness difference of 0, 4 t, 8 t and 12 t measured from the base. The second disk has 4 different steps with thickness difference of 0, t, 2 t and 3 t. Tab. 3 shows the 16 different thickness combinations of the system, which match the discrete reflector system of Tab. 2. Similar to the discrete reflector case, one disk (850B) rotates at 4 times the speed of the other disk (850A).

TABLE 3

Discrete refractve system, dual-disk combination, ref. FIG. 17a.

|  | a | b | c | d | e | f | g | h | i | j | k | l | m | n | o | p |
|---|---|---|---|---|---|---|---|---|---|---|---|---|---|---|---|---|
| 850A | 0 | 0 | 0 | 0 | 4 | 4 | 4 | 4 | 8 | 8 | 8 | 8 | 12 | 12 | 12 | 12 |
| 850B | 0 | 1 | 2 | 3 | 0 | 1 | 2 | 3 | 0 | 1 | 2 | 3 | 0 | 1 | 2 | 3 |
| total | 0 | 1 | 2 | 3 | 4 | 5 | 6 | 7 | 8 | 9 | 10 | 11 | 12 | 13 | 14 | 15 |

In general, the discrete reflector systems have a range of centimeters and the discrete refractive systems have a range of sub-millimeter to millimeters.

Lens Assembly Design Examples for Camera Applications

The design examples below are mainly to illustrate approximate positions of optical components. Higher order image correction is not considered because it does not change component positions drastically. The design is based on first order layout formula of Appendix A.

Scenario (1): Object Size>Image Sensor Size

This scenario is for imaging objects in short- to mid-range. Tab. 4 shows 3 cases of moving zoom lens design. In all cases, an image sensor size of about 8.8-10 mm is assumed. Case A is a mid-range case, roughly equivalent to imaging a person of 1.75 m height at a distance of 10 m with a scan depth of 2 m. Case B is a short-range case, roughly equivalent to imaging a 0.5 m high by 0.5 m deep object at 2.5 m distance. Case C is a very short-range case, roughly equivalent to imaging a 10 cm high by 10 cm deep object at a distance of 50 cm. The magnifications (m=size of object/image sensor height) and object distances (Si here) in these three cases are proportional. Under these conditions, a positive compensator as fA and a positive variator as fB (with significantly less power than fA) give roughly suitable So and D space for the required scanning mechanisms. The resulted $\Delta$So is in the range of millimeters and $\Delta$D is in centimeters. For example, to construct a moving zoom lens system with continuous scanning object plane, a system of Rotary Reciprocating wedge prisms (FIG. 6a) can be used to change So and a Rotary Reciprocating reflector system (e.g. FIG. 3c) can be used to change D. The two systems have the same type of "sinusoidal" motion function. To construct a system with discrete positions, a discrete transparent disk unit (e.g. FIG. 17a) can be used to change So and a discrete reflector unit (e.g. FIG. 15c) can be used to change D.

TABLE 4

Example of moving zoom lens design (Set m and $S_i$, assuming component focal length fA = 36 mm, fB = 200 mm) by 2-component first order computation (all unit in mm)

| Case | m | Si | D | So | T | D + (−)So |
|---|---|---|---|---|---|---|
| A | −200 | 9900 | 91.67 | −27.27 | 10018.94 | |
|  | −200 | 11900 | 116.34 | −25.47 | 12041.81 | |
| difference |  | 2000 | 24.67 | −1.8 |  | 22.87 |
| B | −50 | 2400 | 90.55 | −28.08 |  | |
|  | −50 | 2900 | 117.48 | −26.28 |  | |
| difference |  | 500 | 26.93 | −1.8 |  | 25.13 |
| C | −10 | 500 | 129.33 | −30.6 |  | |
|  | −10 | 600 | 156 | −28.8 |  | |
| difference |  | 100 | 26.67 | −1.8 |  | 24.87 |

One of the most important parameters in the camera system of this invention is the longitudinal resolution. The longitudinal resolution can be related to longitudinal magnification $m_1$ and depth of focus $\delta$ by the following equation:

Longitudinal resolution(minimum object slice thickness)$ts = \delta m_1$

From Fischer and Tadic-Galeb, *Optical System Design*, McGraw-Hill, N.Y., 2000, p. 16-17:

| Longitudinal magnification | $m_1 = \Delta Si/\Delta So$. |
|---|---|
| Therefore, | |
| Longitudinal resolution | $ts = \delta m_1 = \delta \Delta Si/\Delta So$ |
| Maximum number of slices | $Ns = \Delta Si/ts = \Delta So/\delta$ |

The best (smallest) depth of focus of an imaging optics is limited by Rayleigh's criteria ($\lambda/4$ wavefront error) (Ref. Fischer and Tadic-Galeb, *Optical System Design*, p. 57):

$$\delta = +/- 2\lambda(f/\#)^2 \sim = +/- (f/\#)^2 \text{(in micrometer)}$$

f/# is the working f-number of the optical system. Tab. 5 shows the best longitudinal resolution achievable in cases A-C, assuming f/#=2 or 3 respectively.

TABLE 5

Longitudal resolution limit of cases A-C of Tab. 4

| Case | f/# = 3: $\delta \sim = +/- (f/\#)^2 \sim +/- 10$ um | f/# = 2: $\delta \sim +/- 5$ um |
|---|---|---|
| A  $ts = \delta m_1$ | 22 mm | 11 mm |
|     $Ns = \Delta Si/ts$ | 90 | 180 |
| B  $ts = \delta m_1$ | 5.5 mm | 2.8 mm |
|     $Ns = \Delta Si/ts$ | 90 | 180 |
| C  $ts = \delta m_1$ | 1.1 mm | 0.55 mm |
|     $Ns = \Delta Si/ts$ | 90 | 180 |

If the focusing system does not maintain a constant magnification, then the longitudinal resolution will be much worse. For a fixed focal length lens, the longitudinal magnification is the square of the lateral magnification: (Ref. Fischer and Tadic-Galeb, *Optical System Design*, p. 16)

Longitudinal magnification $m_1 = \Delta Si/\Delta So = m^2$

Tab. 6 shows examples using a single fixed focal length lens. Object distance Si and scanning depth S are set to match the values of Tab. 4. The resulted best longitudinal resolution is shown in Tab. 7. We can see that a lens of fixed focal length can only have acceptable longitudinal resolution in low magnification and short-distance situations.

TABLE 6

Example of fixed-FL lens (Set Si, f find So,
m by lens maker formula) (all in mm)

| Case | f | Si | So | m | S* | $m_1 = m^2$ |
|---|---|---|---|---|---|---|
| D | 36 | 10000 | −36.13 | −276.8 | 2000 | 76618 |
| E | 36 | 2500 | −36.53 | −68.44 | 500 | 4684 |
| F | 36 | 300 | −40.9 | −7.33 | 100 | 53.7 |

*Assumed object space depth, to match cases A-C of Tab. 3.

TABLE 7

Longitudal resolution limit of cases D-F of Tab. 6

| Case | | f/# = 3: δ ~= +/− 10 um | f/# = 2: δ ~+/− 5 um |
|---|---|---|---|
| D | ts = δ $m_1$ | 1532 mm | 766 mm |
|   | Ns = S/ts | 1 | 2 |
| E | ts = δ $m_1$ | 93.7 mm | 46.8 mm |
|   | Ns = S/ts | 5 | 10 |
| F | ts = δ $m_1$ | 1.07 mm | 0.54 mm |
|   | Ns = S/ts | 93 | 186 |

Scenario (2): Long Distance Zoom Lens

This scenario is imaging of large objects at long distance or imaging of a small volume at mid-range. Tab. 8 shows these two situations. It is still assumed that an image sensor of 8.8-10 mm high is used. Case G is imaging of an object (e.g. a part of a building) of 5 m height with a scan depth of 20 m at a distance of 100 m. Case H is imaging of an object of 14 cm height and 20 cm depth at a distance of 5 m. These cases require higher zoom power than cases A-C. Therefore, telephoto lens design (Magnar) (negative fA with positive fB) is preferred. Under these conditions, ΔSo is generally larger than ΔD. In Case G, both ΔSo and ΔD are in centimeter range. To construct a continuous scanning system, moving reflector systems are preferred for both the So changing unit and the D changing unit. To construct a discrete scanning system, use discrete reflector systems for both parameters too. In Case H, ΔD is in millimeter range. A refractive displacement unit can be used. When the lens groupings are moved directly, lens grouping 305B needs to be moved by an amount of (D+So), as shown in Tab. 4 and in Tab. 8.

TABLE 8

Example of moving zoom lens design for long distance zoom
(all unit in mm)

| | m | T | fA | fB | D | So | D + (−)So |
|---|---|---|---|---|---|---|---|
| Case G | −568 | 100000 | −100 | 125 | 96.34 | −40.48 | |
| | −568 | 120000 | −100 | 125 | 84.43 | −68.62 | |
| difference | | 20000 | | | −11.91 | 28.14 | 16.23 |
| Case H | −16.33 | 5000 | −100 | 125 | 72.02 | −128.98 | |
| | −16.33 | 5200 | −100 | 125 | 70.16 | −138.40 | |
| difference | | 200 | | | −1.86 | 9.42 | 7.56 |

Scenario (3): Object Size<<Image Sensor Size

This scenario is a microscopic 3D camera. In FIG. 17, 920 is the microscope objective lens. The image sensor is on the image plane 901. The object plane 911 is in the sample space 910. 33 are the principal rays and 34 are the axial rays. In order to scan the depth rapidly, a "refractive displacement" device 930 is inserted into the optical path to change the effective path length. 33a and 34a indicates the refracted rays. 911a indicates the displaced object plane. For space issue, microscope objectives with long working distance are preferred. Besides regular microscope setup, refractive displacement devices can also be used on other types of optical microscope for rapid depth scanning, such as Confocal Scanning Optical Microscope (CSOM). A description of CSOM can be found in Kino and Corle, "Confocal scanning optical microscopy", *Physics Today*, September 1989, p. 55, which is incorporated herein by reference.

Image Sensor

In order to capture moving 3D image, high frame rate image sensor is needed. The preferred image sensor is high-speed CMOS image sensor. These sensors have resolutions from VGA up to 10 Mpixels. Frame rate can be up to 10,000 full frames per second. One typical example is a quantity production product from Micron (www.micron.com): MT9M413C36STC. The image sensor has 1280H×1024V pixels with a maximum full frame rate of 500 fps. At partial scan, the frame rate is inversely proportional to the number of vertical rows of the area of interest. For example, if partial scan covers 1280×256 pixels, then the frame rate is 2000 fps. Applying this number to the continuous scanning system of this invention, if each volume scan has 100 frames, then the volume sweep rate is 20 volumes per second. In the discrete system, if 16 frames are taken in each volume scan, then the volume sweep rate is 125 volumes per second. These rates are enough to provide moving 3D images.

Structured Illumination

In methods of SFF or DFD, the computation of focus or defocus relies on texture information on the 3D surface. However, if the part to be imaged does not have enough texture, then a structured illumination is needed to add texture information to the 3D surface. For DFD methods, structured illumination is especially helpful in the computation of defocus function.

A separate projector (such as a laser pattern projector) can project a structured pattern to the object. Alternatively, a pattern projection system can be integrated into the 3D camera. In general, this is to use a beam splitter to guide the pattern projection beam into the optical path of the 3D camera and to use the imaging lens as a projection lens. FIG. 18a illustrates an example. The D changing unit 1700 uses a moving reflector-pair. The structured illumination system includes a light source 1093 and a pattern mask 1092. A polarization beam splitter 392 and a quarter wave plate 393 are used for the merging and splitting of the illumination beam and the image beam. FIG. 18b illustrates another example, which uses the system of FIG. 15c as the D changing unit 1700. The light in the system is therefore polarized. A s-polarizer 1091s must be used after the pattern mask and before the plate beam splitter 398, so that only s-polarized illumination beam is sent into the D changing unit.

In order to obtain color images, it is preferred that structured illumination does not interfere with the capture of actual colors of the target. One approach is to separate the capture of actual color image and the capture of structurally illuminated image in the time domain. That is, at or near each focus position, the camera captures two successive exposures. One exposure is under structured illumination, but the other is not. In practice, LEDs (light emitting diodes) or a lamp with a high speed FLC (ferroelectric liquid crystal) shutter can be used as the light source, so that the light source can be modulated at high speed to match the frame rate of the image sensor. This effectively cuts the usable frame rate of the image sensor in half.

In order to capture 3D motion in color in real time, it is preferred that the structurally illuminated frame and the naturally illuminated frame are captured in the same frame at the same time. The basic concept is creating structured illumination using invisible light, separating the path of visible light and structured light, and then capturing the structurally illuminated frame in a separate area on the same image sensor. FIG. 19b illustrates the active area of the image sensor in perspective view. Within the active area of the image sensor 101A, a sensing area 108 is selected. The sensing area is divided into two isolated parts, 108A and 108B. Taking the example of the Micron CMOS sensor described previously, if the sensing area has 1280×256 pixels, then each of the two parts has 640×256 pixels. The Micron sensor is not only sensitive to visible light but is also sensitive to near infrared (n-IR) range. An n-IR source, such as LEDs or a diode laser of 780-808 nm, can be used as the light source 1093. Part 108A is used to capture the n-IR part of an image frame. Part 108B is used to capture the visible part of an image frame. For convenience, this can be called "Divisional Sensor Area" approach.

FIG. 19a illustrates an example of optical layout in side view. The n-IR path is in dotted lines and the visible path is in dashed lines. The D changing unit 1700 uses a moving reflector-pair system similar to FIG. 11a. However, the reflector-pair has a double-layer structure. The inner reflector pair (1301 & 1302) reflects visible light. The outer reflector pair (574A & 574B) reflects n-IR but is transparent to visible light. This can be made by coating a mirror on one side of a clear glass plate and by coating a IR-reflecting dielectric layer on the other side. When incoming light beam travels to path 103d, the n-IR image leads the visible image by a short distance. Before entering lens 305A, this short lead is compensated by placing the n-IR reflector 574 at the back of the visible reflector 575. The visible reflector is of the type sometimes called "cold mirror", because heat passes but visible light reflects. The two reflectors are tilted respectively to separate the n-IR path 103e and the visible path 103a and to send the paths onto the two different parts of the image sensor.

FIG. 19c illustrates another example of optical layout for Divisional Sensor Area approach in side view. The D changing unit 1700 uses a single moving reflector system similar to the one of FIG. 11b, except that the moving reflector has a double-layer structure. The double layer structure includes an n-IR reflector 574C placed a short distance before a reflector 391. The spacing between the n-IR reflector 574C and the reflector 391 is half of the path difference between reflector 575 and 574. Therefore, the total lengths of the n-IR path (dot-dot lines) and the visible path (dash-dash lines) are equal.

The double-layer structure can also be applied to discrete reflector such as the one of FIG. 15a by placing an n-IR reflector before each stair-step at a fixed spacing.

The optical layouts for the Divisional Sensor Area approach described above works even if the structured illumination is not an integrated part of the 3D camera. If an integrated illumination system is desired, the illumination beam can enter the n-IR path from 103b and then follows the n-IR imaging path in the reversed direction.

Calibration and Correction of Periodical Error

The rapid focusing and zooming systems described above are based on mechanical motion. Therefore, position errors due to manufacturing tolerance and alignment deviation are inevitable. However, the motion mechanisms described above, especially the Rotary Reciprocating mechanism, are periodical. As a result, the motion error is also of periodical nature. For example, if one of the object planes deviates away from the ideal centerline during an outward scan, this object plane will deviate to the same direction with the same amount during the next outward scan. Such errors of periodical nature can therefore be corrected by a pre-calibration. In general, the calibration and correction process includes the following steps:

(1) Use a target containing several point spots of known positions (x, y, z). The target spots spread over the volume of the object space.
(2) Use the 3D camera to capture a raw 3D image of the target and then compute the spot positions from the raw 3D image.
(3) Compare the computed positions with the correct positions and record a correction vector for each spot. Put this set of correction vectors into the algorithm of the image processing software (or firmware). Any (x, y, z) position computed from the captured raw 3D image will then be corrected with a correction vector to obtain the corrected 3D image. If the (x, y, z) point does not locate on any spot used in the calibration set, interpolation is applied to determine how much correction should be applied.

APPENDICES

Appendix A First Order Thin Lens Layout Formula

This section includes the formula that describes the relation of the locations and the powers of lens in an optical system. These formula are from Hecht, E., *Optics,* 2nd ed., Addison-Wesley, Reading Mass., 1987, pp. 138 and from Smith, W. J. "First-order Layout: from imagery to achromatism to athermalization to cost" in *Lens Design,* ed. by W. J. Smith, SPIE Optical Engineering Press, Bellingham, Wash., 1992.

Gaussian lens formula (or Lens marker's formula) describes image formation by a single lens:

| | |
|---|---|
| $1/f = 1/So + 1/Si$ | (A1) |
| $M = -Si/So$ | (A2) | where f is the focal length of the lens, So is object distance (the distance between the lens and the object), Si is image distance (the distance between the lens and the image of the object formed by the lens), and M is magnification. (In equations (A1)-(A2), by Hecht's sign convention, So takes a positive value for a real object.)

In general, most optical systems are either limited to two components or can be separated into two-component segments. For a two-component system operates at finite conjugates as shown in FIG. 20, the following equations apply. In case the required system magnification m (m=h'/h) and the component locations are known, the focal length of the components are given by the following equations:

| | |
|---|---|
| $fA = mSoD/(mSo - mD - Si)$ | (A3) |
| $fB = DSi/(D - mSo + Si)$ | (A4) | where fA and fB are the focal lengths of the components (positive for converging lens and negative for diverging lens), D is the distance between the components, So is the distance between the object and component A, Si is the distance between the image and component B.

In case the component powers (defined as the reciprocal of the focal length), the object-to-image distance T, and the magnification m are known, the component locations can be determined from the following equations:

$$T = -[D^2 + (m-1)^2 * fA * fB/m]/(fA + fB - D) \quad (A5)$$
$$So = [(m-1)D + T]/[(m-1) - mD/fA] \quad (A6)$$
$$Si = T + So - D \quad (A7)$$

(In equations (A3)-(A7), by Smith's sign convention, So takes negative value for a real object.) There are six parameters, fA, fB, D, So, Si and m. Given any four parameters, the rest two parameters can be determined by solving equations (A3)-(A4) or (A5)-(A6).

Appendix B Example of Optical Design of Variable Focusing

A SLM of 8.75 mm height is used to generate volumetric 3D images in a display space of depth 3" (76.2 mm). At the middle of the display space (i.e. at depth 1.5"), the height of the space is 5.625" (142.88 mm). A lens of f=36 mm is used.

Therefore, magnification at the middle position m(mid)=−142.88/8.75=−16.33

By Gaussian lens formula (Appendix A, eqn. (A1)-(A2)), the corresponding Si and So at the middle position of the image space can be obtained as follows:

Si (mid)=24.56" (623.83 mm), So (mid)=1.504" (38.21 mm)

Therefore, Si should scan the image space from about 23" to about 26".

Si (far point)=26.06" (661.93 mm), So (mid)=1.499" (38.07 mm), m=−17.39

Si (near point)=23.06" (585.73 mm), So (mid)=1.510" (38.36 mm), m=−15.27

FIG. 21 shows the Si to So relation by Gaussian lens formula. A change of only 0.29 mm of So gives a change of 3" (76.2 mm) of Si. In addition, the So to Si curve can be approximated by a linear relation.

Appendix C Focus Shift by Parallel Transparent Material

Figure 22A:
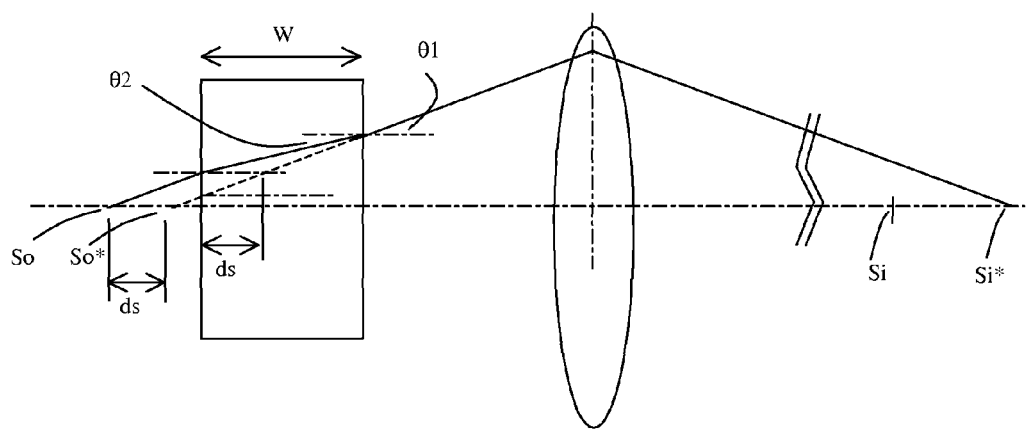
FIG. 22a-c Appendix C's explanation of focus shift by parallel transparent material FIG. 23a-d Appendix D's optical design examples of a moving zoom lens system FIG. 24a-b Appendix D's optical design examples of a moving zoom lens system FIG. 25a-c Appendix E's geometric analysis of motions
Figure 22B:
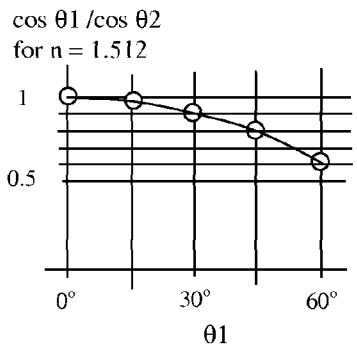

FIG. 22a illustrates a geometric analysis in the situation of a parallel transparent material between a converging lens and an object. The focus shift ds can be determined as follows:

$$\sin\theta 1/\sin\theta 2 = n \text{(Snell's law)}$$

$$ds/W = (W\tan\theta 1 - W\tan\theta 2)/W\tan\theta 1 = 1 - \tan\theta 2/\tan\theta 1 = 1 - (\sin\theta 2/\sin\theta 1)(\cos\theta 1/\cos\theta 2) = 1 - (\cos\theta 1/\cos\theta 2)/n \quad (C1)$$

$$(\cos\theta 1/\cos\theta 2) \sim 1 \text{ (see FIG. 22b)}$$

$$ds/W \sim = 1 - 1/n \quad (C2)$$

Figure 22C:
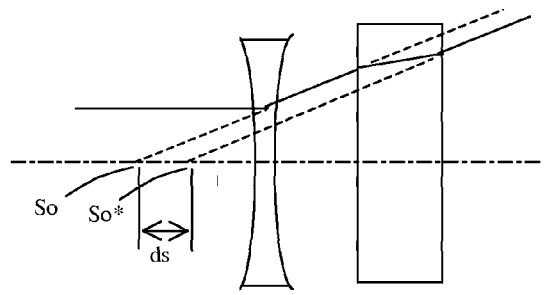

The equations also apply to the case of a diverging lens, as shown in FIG. 22c. Note that "object" and "image" are interchangeable. In summary, the focus shift is toward the direction of travel of light (i.e. toward downstream direction).

Appendix D Optical Design of a Moving Zoom Lens System

Figure 23A:
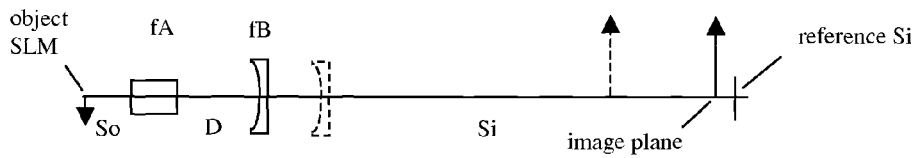

The design here is for illustrating design principle only. Therefore, the 2-component system layout formula of Appendix A is used. The example of Appendix B is used as a reference case (Tab. D1 row #1). It is assumed that component A is compensator and fA=36 mm. Adding a negative lens (as variator) to the front can maintain the projected image at the same magnification in a range within the image distance of the reference case (i.e. for Si<624 mm). Table D1 Example 1 shows an example. The negative lens (component B) and the image plane move in opposite directions. The displacement of the negative lens is on the same order as that of the object plane. FIG. 23a illustrates this example. The change of So is in millimeters range.

Figure 23B:
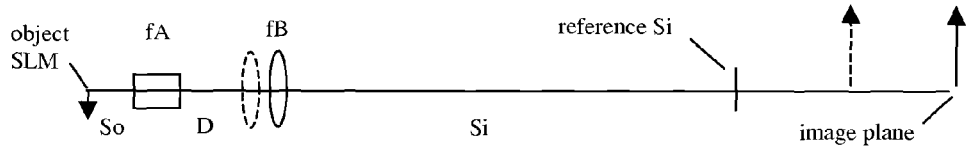

Adding a positive lens (as variator) to the front can maintain the projected image at the same magnification in a range (slightly) beyond the image distance of the reference case (i.e. for Si>624 mm). Example 2 shows an example. The variator and the image plane move in the same direction. The displacement of the variator is smaller than that of the image plane. FIG. 23b illustrates this example. The change of So is within one millimeter. The change of D is within a few centimeters.

TABLE D1

| | Set m, T, fA, fB to find suitable component locations (all unit in mm) | | | | | |
| --- | --- | --- | --- | --- | --- | --- |
| | m | T | fA | fB | D | Si | So |
| Reference case | −16.33 | 662 | 36 | — | — | 624 | −38 |
| Example 1 | −16.33 | 500 | 36 | −150 | 107.92 | 348.75 | −43.33 |
| | −16.33 | 576.2 | 36 | −150 | 65.89 | 465.26 | −45.04 |
| difference | | 76.2 | | | −42.03 | | 1.71 |
| Example 2 | −16.33 | 800 | 36 | 200 | 78.1 | 691.31 | −30.58 |
| | −16.33 | 876.2 | 36 | 200 | 95.22 | 751.05 | −29.93 |
| difference | | 76.2 | | | 17.12 | | −0.65 |

TABLE D1-continued

Set m, T, fA, fB to find suitable component locations (all unit in mm)

|  | m | T | fA | fB | D | Si | So |
|---|---|---|---|---|---|---|---|
| Example 3 | −200 | 10019 | 36 | 200 | 91.67 | 9900 | −27.27 |
|  | −200 | 12042 | 36 | 200 | 116.34 | 11900 | −25.47 |
| difference |  | 2023 |  |  | 24.67 |  | −1.8 |
| Example 4 | −568 | 100000 | −100 | 125 | 96.34 | 99863 | −40.48 |
|  | −568 | 120000 | −100 | 125 | 84.43 | 119847 | −68.62 |
| difference |  | 20000 |  |  | −11.91 |  | 28.14 |

Special Case: Variable focusing by changing D only

In the 2-component system, if So is fixed and only D is allowed to change, then this is another variable focusing system. Tab. D2 shows an example. This example is similar to Example 1 except that So is fixed. The change of D is under 1 centimeter. The change of m is slightly bigger than that of Appendix B (variable focusing by changing So).

TABLE D2

Fixed So = −44.19 mm, set So, T, fA, fB to find D, SI and m (unit in mm)

|  | T | fA | fB | D | Si | m |
|---|---|---|---|---|---|---|
| Example 5 | 500 | 36 | −150 | 87.77 | 368.04 | −15.19 |
|  | 576.2 | 36 | −150 | 81.83 | 450.19 | −17.60 |
| difference | 76.2 |  |  | −5.94 |  |  |

Figure 23C:
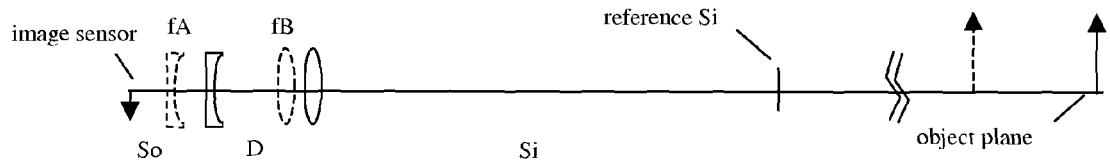

The configuration of Example 2 can be used at larger Si and m for camera applications, as shown in Example 3. So and D changes are within a few millimeters and centimeters respectively. To maintain constant m at even larger distance, a telephoto lens configuration is preferred. A telephoto lens has a negative fA and a positive fB (Ref. Hecht, E., *Optics,* 2nd ed., Addison-Wesley, Reading Mass., 1987, pp. 202). Example 4 shows an example. Both D and So changes are in centimeters' range. FIG. 23c illustrates this example.

Figure 23D:
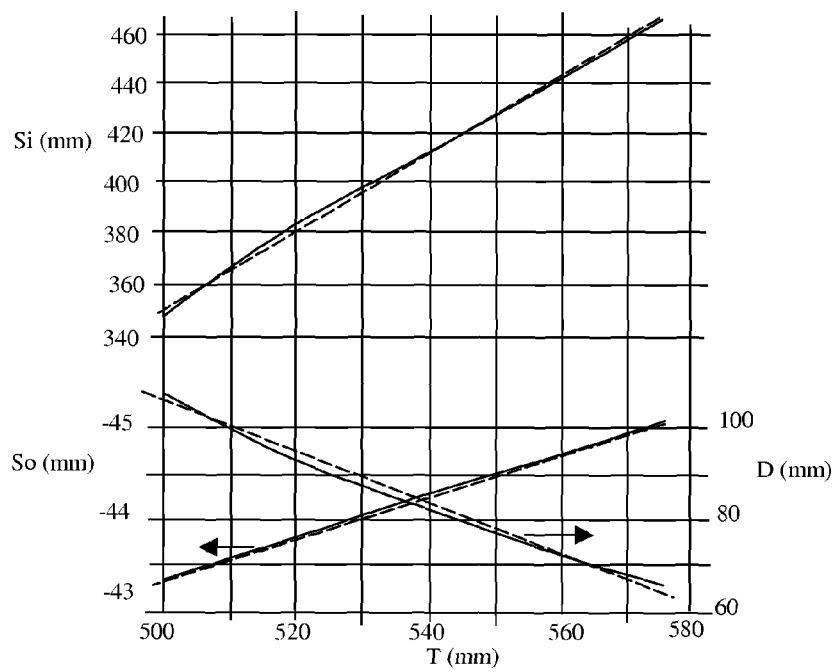
Figure 24A:
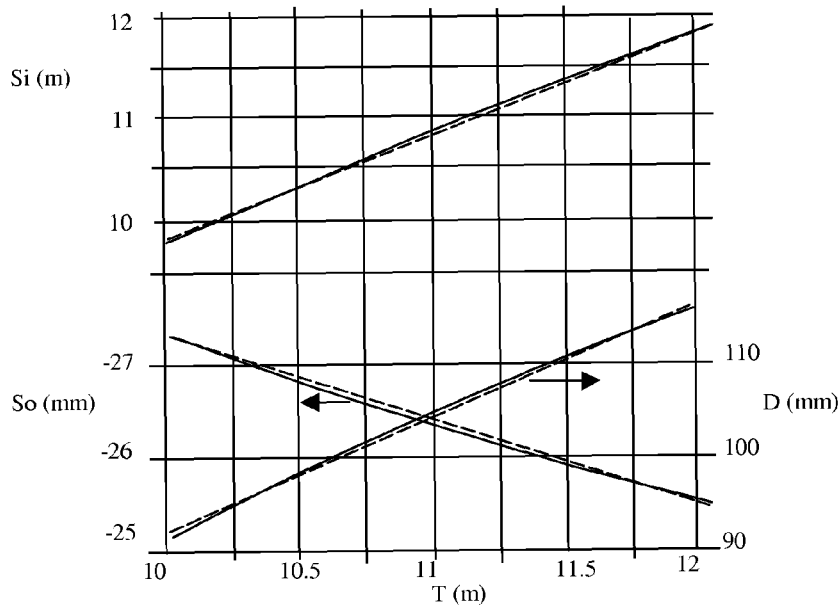
Figure 24B:
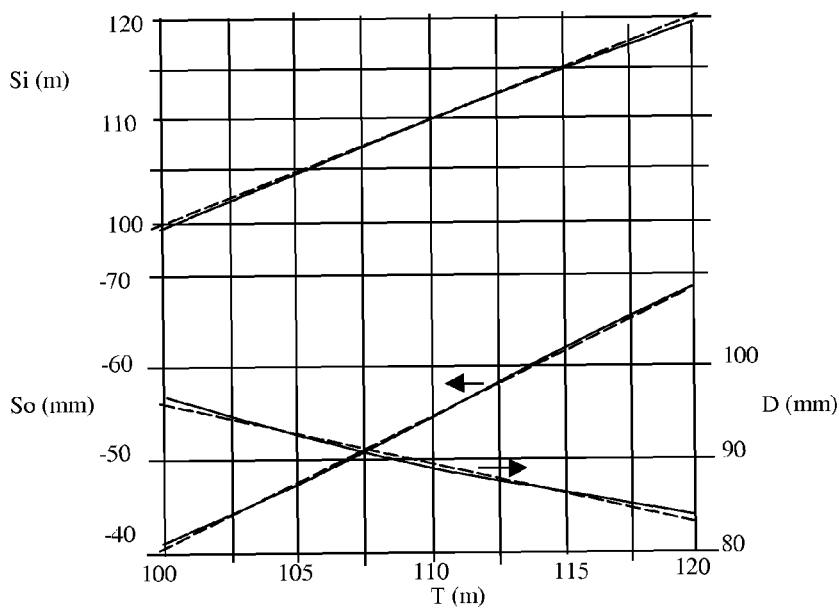

FIG. 23d, FIG. 24a and 24b plot the calculated component locations relative to different values of T for Example 1, 3 and 4. The plots show that the change of distance between any two components is very close to a linear relation. This linear approximation is valid for different lens configurations over a wide working distance.

Appendix E Geometric Analysis of Motions (1) Rotary Reciprocating Plane

Figure 25A:
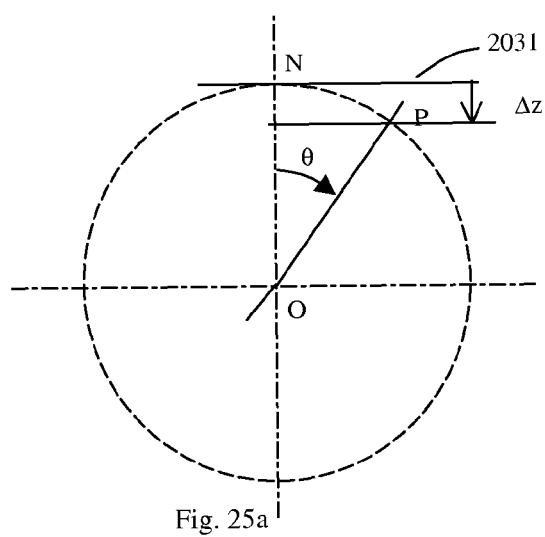
Figure 25B:
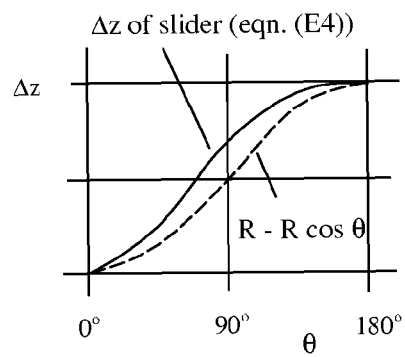

Referring to FIG. 25a, 25b

Plane 2031 revolves about point O while keeping its surface always facing upward direction. R is radius of rotation (i.e. R=ON=OP). The change of vertical position of the screen $\Delta z$ as a function of revolving angle $\theta$ is as follows:

$$\Delta z = ON - OP \cos\theta = R - R\cos\theta \quad (E1)$$

$\Delta z$ is a sinusoidal function.

(2) Slider-Crank Motion

Figure 25C:
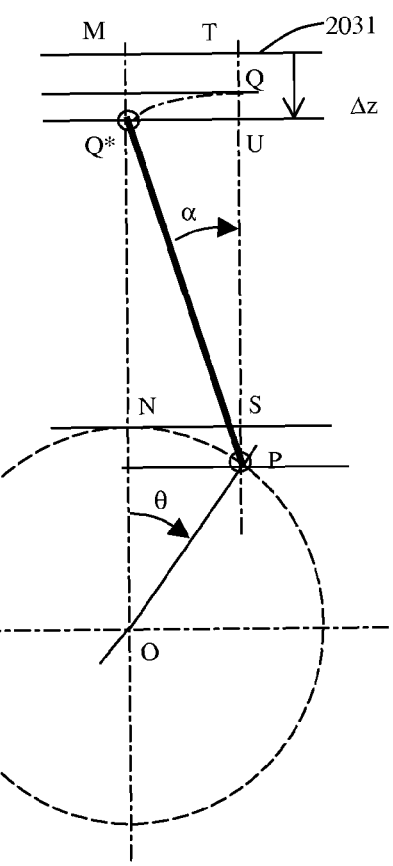

Referring to FIG. 25c, 25b

FIG. 25c shows a crank rotates around O. A connecting rod connects the crank at P and the slider at Q*. The slider moves along MN line.

Assume the length of connecting rod is L:
  L=PQ*=MN=PQ=TS
From (E1): TQ=PS=R−R cos $\theta$
From triangles: L sin $\alpha$ = R sin $\theta$
  QU=L−L cos $\alpha$ $$\Delta z = TQ + QU = R - R\cos\theta + L - L\cos\alpha = R - R\cos\theta + L - L(\sqrt{1-(\sin\alpha)^2}) = R - R\cos\theta + L(1 - sqrt(1-(R\sin\theta/L)^2)) \quad (E2)$$

FIG. 25b shows equation (E2) in comparison with equation (E1). Equation (E2) has the additional amount of [L(1−sqrt (1−(R sin $\theta$L)$^2$))]. At $\theta$=90°, the maximum difference gives $\Delta z$=R−R cos $\theta$+L(1−sqrt (1−(R/L)$^2$)).

LIST OF PARTS IN DRAWINGS

1091s, 571s, polarizer
101 image sensor
103 optical centerline of image beam, centerline of imaging lens
104 object plane
105 image plane
107 aperture
1000 rapid focusing system
1301 & 1302 moving reflector-pair placed at right angle
221 reflector
2031 moving screen
2040 display volume
301 image source, image panel, spatial light modulator (SLM)
303 optical centerline of projection beam, centerline of projection lens
305, 305A, 305B lens assembly, lens groupings A and B
33 principal rays
34 axial rays
391 moving reflector
398 non-polarizing beam splitter
391 moving reflector
392 polarization beam splitter (PBS)
393, 393a, 393b quarter wave plate
total internal reflection (TIR) prism
401, 402, 401F, 402F thin wedge prism
4011, 4012, 4021, 4022 surfaces of thin wedge prisms
420 slider-crank mechanism
421 crank
422, 431 connecting rod
423 linear bearing
432A, 432B, 433, 433A, 433B timing gear
434A, 434B, 701 counter weight
435, 536 timing belt
481, 481A transparent disk with helical surface
510a-d rotary arms
575 cold mirror
574, 574A, 574B, 574C n-IR reflective coating 580, 580A, 580B discrete reflector with stair-like reflective surfaces
liquid crystal discrete reflector system
682a, 682b, 682c, 693 helix chiral cell
683a, 683b, 683c glass plates
692 dielectric reflector
681a, 681b switchable half-wave plate
70 wedge-shaped base
700 obliquely moving reflector
71, 72 surfaces of wedge-shaped base
850A, 850B transparent disk with stair-like discrete thickness variation
90 3D object
920 microscope objective lens
1092 pattern mask
1093 light source

The invention claimed is:

1. Method of rapid and repeated focusing of a lens system in a projection means for projection of volumetric 3D images or in an imaging means for imaging of a 3D object, said lens system including a first lens group and a second lens group, the method includes a feature of rapidly and repeatedly changing the optical path length of path So or of path D by a first path length changing means in order to change focus rapidly and repeatedly;
   said path So representing the optical path between said first lens group and the image panel of said projection means or the image sensor of said imaging means;
   said path D representing the optical path between said first lens group and said second lens group;
   said first path length changing means including a wedge-shaped optical device and a moving means, said wedge-shaped optical device including a first surface and a second surface, the two surfaces forming a finite wedge angle in between, said moving means rapidly and repeatedly moving said wedge-shaped optical device along the plane of said first surface, this motion causing the intersection of the centerline of the optical path with said second surface to displace along the centerline, this displacement changing the optical path length, thereby changing focus of said lens system rapidly and repeatedly.

2. Method of claim 1, wherein said wedge-shaped device including a wedge prism device or a reflector device, said wedge prism device including a thin wedge prism, said reflector device including a single flat reflector mounted on a wedge-shaped base.

3. Method of claim 2, wherein said moving means moving said wedge-shaped optical device in rotary reciprocating motion, said rotary reciprocating motion having the feature that said wedge-shaped optical device revolves around an axis but keeps the orientations of the surfaces unchanged.

4. Method of claim 3, wherein said projection of volumetric 3D images comprises the use of a rotary reciprocating screen, said rotary reciprocating screen having a feature that said screen revolves about an axis and sweeps a volume but keeps its surface always facing a fixed direction, the rotary reciprocating motion of said wedge-shaped optical device being in synchronization with said rotary reciprocating screen.

5. Method of claim 2, wherein said wedge prism device further including a second thin wedge prism, the method including features of:
   placing the two thin wedge prisms closely together with their inner surfaces forming a parallel air gap and their outer surfaces parallel;
   moving the two thin wedge prisms relative to each other to change their total thickness.

6. Method of claim 5, wherein the feature of moving said two thin wedge prisms including one of the following means:
   (a) moving one thin wedge prism by rotary reciprocating motion relative to the other thin wedge prism, said rotary reciprocating motion having the feature that the prism revolves around an axis but keeps the orientation unchanged;
   (b) placing said two thin wedge prisms to intercept the optical path with part of their surface areas from opposite directions, orienting them with a phase difference of 180 degree, and rotating them in the same direction at the same speed.

7. Method of claim 6, further including features of:
   providing a second path length changing means;
   simultaneously changing the optical path length of said path So and said path D to keep the magnification constant by using said second path length changing means and said first path length changing means;
   said second path length changing means including a moving reflector-pair in rotary reciprocating motion or an obliquely moving reflector in rotary reciprocating motion, said rotary reciprocating motion having the feature that the reflector revolves around an axis but keeps the orientation unchanged.

8. Method of claim 2, further including features of:
   providing a second path length changing means;
   simultaneously changing the optical path length of said path So and said path D to keep the magnification constant by using said second path length changing means and said first path length changing means;
   said second path length changing means including one of the following means:
      (a) a means similar to said first path length changing means;
      (b) a reflective displacement means that folds the optical path by a reflector system and rapidly moves the reflector system to change the optical path length;
      (c) a mechanical displacement means that rapidly moves a lens group directly.

9. Method of claim 8, wherein said reflective displacement means including a moving reflector-pair, said mechanical displacement means including a slider-crank mechanism, or a cross slider crank mechanism, or a cross slider eccentric mechanism.

10. System of rapid and repeated focusing in a projection means for projection of volumetric 3D images or in an imaging means for imaging of a 3D object, the system comprises:
   a lens system, said lens system comprising a first lens group and a second lens group;
   a focusing means for rapidly and repeatedly changing an optical path length, said focusing means comprising a thin wedge prism and a moving means, said moving means moving said thin wedge prism with respect to the optical path in order to change the thickness of the prism that is traveled through by the optical path, thereby changing effective optical path length in order to change focus of said lens system rapidly and repeatedly.

11. System of claim 10, wherein said focusing means further including a second thin wedge prism, the two thin wedge prisms being placed closely together with their inner surfaces forming a parallel air gap and their outer surfaces parallel, said moving means moving the two thin wedge prisms relative to each other to change their total thickness.

12. System of claim 11, wherein said moving means moving the two thin wedge prisms by one of the following means:

(a) moving one thin wedge prism in rotary reciprocating motion relative to the other thin wedge prism, said rotary reciprocating motion having the feature that the prism revolves around an axis but keeps the orientation unchanged;

(b) placing said two thin wedge prisms to intercept the optical path with part of their surface areas from opposite directions, orienting them with a phase difference of 180 degree, and rotating them in the same direction at the same speed.

13. System of claim 10, wherein
said moving means comprises a rotary reciprocating mechanism, said rotary reciprocating mechanism driving said thin wedge prism to revolve around an axis but keep the orientations of its surfaces unchanged;
said projection of volumetric 3D images comprises the use of a rotary reciprocating screen, said rotary reciprocating screen having a feature that said screen revolves about an axis and sweeps a volume but keeps its surface always facing a fixed direction, the rotary reciprocating motion of said thin wedge prism being in synchronization with said rotary reciprocating screen.

14. Method of rapid and repeated focusing and zooming of a lens system in a projection means for projection of volumetric 3D images or in an imaging means for imaging of a 3D object, said lens system comprising a first lens group and a second lens group, said zooming maintaining a constant magnification, the method includes features of:
rapidly changing the optical path length of path So within a first pre-determined range of distance by using a first path length changing means;
rapidly changing the optical path length of path D within a second pre-determined range of distance by using a second path length changing means;
said path So representing the optical path between said first lens group and the image panel of said projection means or the image sensor of said imaging means;
said path D representing the optical path between said first lens group and the second lens group;
said path length changing means including one or two selections from the following means:
(a) a refractive displacement means that places a transparent material of varying thickness in the optical path and moves the transparent material with respect to the optical path to change the thickness of the transparent material that is traveled by the optical path;
(b) a reflective displacement means that folds the optical path by a reflector system and rapidly moves the reflector system to change the optical path length;
(c) a mechanical displacement means that rapidly moves the lens groups directly;
the selection being based on said first pre-determined range of distance and said second pre-determined range of distance;
the changes of optical path length of said path So and of said path D being in proportion and having the same type of motion function and thereby causing said rapid and repeated focusing and zooming.

15. Method of claim 14, wherein said transparent material of varying thickness including a thin wedge prism, said reflector system including a single flat reflector, said single flat reflector moving obliquely with respect to the optical path.

16. Method of claim 15, wherein said lens system including one of the following combinations:
a positive lens group serving as said first lens group and a positive lens group serving as said second lens group; or
a negative lens group serving as said first lens group and a positive lens group serving as said second lens group.

17. Method of claim 15, wherein said imaging means including a structured illumination means that does not interfere with the capture of color images, said structured illumination means including one of the following means:
(i) a spatial separation means that includes the features of:
projecting a structured pattern of invisible light onto said 3D object, thereby said 3D object having a visible image and an invisible image;
separating the invisible image and the visible image of said 3D object by a filter means and capturing the invisible image and the visible image in separate areas of said image sensor;
(ii) a time separation means that includes the feature of modulating a structured illumination by a modulation means to match the frame rate of said image sensor so that two sets of images are taken, one set containing structurally illuminated images, the other set containing naturally illuminated images.

18. Method of claim 14, wherein
said refractive displacement means including one of the following means:
(i) providing a transparent disks with stair-like thickness variation as said transparent material of varying thickness, rotating the disk to change the thickness intersected by the optical path;
(ii) providing a first transparent disk of means (i) with M variations of thickness and a second transparent disk of means (i) with N variations of thickness, rotating the two disks at different speeds to obtain a thickness variation of M×N combinations;
said reflective displacement means including one of the following means:
(iii) providing a reflector with stair-like reflective surfaces as said system of reflector, rotating the disk to change the position of reflective surface intersected by the optical path;
(iv) providing a switchable multi-layer liquid crystal reflector unit as said system of reflector.

19. Method of claim 18, wherein said lens system including one of the following combinations:
a positive lens group serving as said first lens group and a positive lens group serving as said second lens group; or
a negative lens group serving as said first lens group and a positive lens group serving as said second lens group.

20. Method of claim 19, wherein said imaging means including a structured illumination means that does not interfere with the capture of color images, said structured illumination means including one of the following means:
(i) a spatial separation means that includes the features of:
projecting a structured illumination of invisible light onto said 3D object, thereby said 3D object having a visible image and an invisible image;
separating the invisible image and the visible image of said 3D object by a filter means and capturing the invisible image and the visible image in separate areas of said image sensor;
(ii) a time separation means that includes the feature of modulating a structured illumination by a modulation means to match the frame rate of said image sensor so that two sets of images are taken, one set containing structurally illuminated images, the other set containing naturally illuminated images.

* * * * *